US012756272B2

(12) United States Patent
Zhou et al.

(10) Patent No.: US 12,756,272 B2
(45) Date of Patent: Oct. 6, 2026

(54) POWER ELECTRONIC SYSTEMS AND ELECTRIC DRIVE TRAIN SYSTEMS HAVING MULTIPLE MODES OF OPERATION

(71) Applicant: Toyota Motor Engineering & Manufacturing North America, Inc., Plano, TX (US)

(72) Inventors: Feng Zhou, Ann Arbr, MI (US); Tianzhu Fan, Houston, TX (US); Yohei Iwahashi, South Lyon, MI (US); Ercan Mehmet Dede, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 216 days.

(21) Appl. No.: 18/813,343

(22) Filed: Aug. 23, 2024

(65) Prior Publication Data

US 2026/0058527 A1 Feb. 26, 2026

(51) Int. Cl.
*H05K 1/18* (2026.01)
*H02K 7/18* (2006.01)
(Continued)

(52) U.S. Cl.
CPC ................ *H02K 9/19* (2013.01); *H02K 7/18* (2013.01); *H02K 11/25* (2016.01); *H02K 11/33* (2016.01); *H02M 7/537* (2013.01)

(58) Field of Classification Search
CPC . H02K 9/19; H02K 7/18; H02K 11/25; H02K 11/33; H02M 7/537; H02M 1/007;
(Continued)

(56) References Cited

U.S. PATENT DOCUMENTS 11,227,821 B2 1/2022 Zhou
11,404,351 B2 8/2022 Zhou
(Continued)

FOREIGN PATENT DOCUMENTS

CN 107919689 A 4/2018
CN 212063594 U 12/2020

OTHER PUBLICATIONS

U.S. Appl. No. 18/125,275, filed Mar. 23, 2023.
(Continued)

*Primary Examiner* — Muhammad S Islam
(74) *Attorney, Agent, or Firm* — Dinsmore & Shohl LLP

(57) ABSTRACT

A power electronics system for an electric motor includes a first inverter package having a first housing defining a first enclosure and MOSFET pairs disposed within the first enclosure, wherein an output of each MOSFET of each MOSFET pair are coupled together and operable to be electrically coupled to a first end of a winding of the electric motor. The power electronics system further includes a second inverter package having a second housing defining a second enclosure and three IGBT pairs disposed within the second enclosure, wherein an output of each IGBT of each IGBT pair are coupled together and operable to be electrically coupled to a second end of the winding of the electric motor, and the IGBT pairs are cooled by immersion within the dielectric cooling fluid. A state selector circuit is operable to selectively electrically couple the second ends of the windings of the electric motor together.

20 Claims, 17 Drawing Sheets

(51) Int. Cl.

| | |
|---|---|
| ***H02K 9/19*** | (2006.01) |
| ***H02K 11/25*** | (2016.01) |
| ***H02K 11/33*** | (2016.01) |
| ***H02M 7/537*** | (2006.01) |

(58) Field of Classification Search
CPC ... H02M 3/1584; H02M 7/003; H02M 7/5387
See application file for complete search history.

(56) References Cited

U.S. PATENT DOCUMENTS

| | | | | |
|---|---|---|---|---|
| 2016/0149512 | A1* | 5/2016 | Nakatsu | H02M 7/003 361/707 |
| 2019/0305689 | A1* | 10/2019 | Ando | H01F 19/00 |
| 2020/0177092 | A1* | 6/2020 | Ledezma | H02P 27/08 |

OTHER PUBLICATIONS

U.S. Appl. No. 18/162,905, filed Feb. 1, 2023.
U.S. Appl. No. 18/106,779, filed Feb. 7, 2023.
Chen et al., "Double-Side Direct Oil-Cooling Automotive Power Module: from material Compatibility to Thermal Management", 11th International Conference on Power Electronics—ECCE Asia; May 22-25, 2023, pp. 33-38, ICC Jeju, Jeju, Korea.

* cited by examiner

POWER ELECTRONIC SYSTEMS AND ELECTRIC DRIVE TRAIN SYSTEMS HAVING MULTIPLE MODES OF OPERATION

TECHNICAL FIELD

The present specification generally relates to power electronics systems and electric drive trains and, more specifically, power electronics systems and electric drive trains having increased flexibility and modes of operation in a compact package size.

BACKGROUND

Due to the increased use of electronics in vehicles, there is a need to make electronic systems more compact. One component of these electronic systems is a power electrical component used as a switch in an inverter. Power electrical components have large cooling requirements due to the heat generated.

Additionally, there has been a trend for power electrical components conventionally composed of silicon to now be composed of silicon-carbide. The use of silicon-carbide causes a larger heat flux due to it defining a smaller device footprint. For these reasons, and more, there is a need to improve the cooling of power electrical components while maintaining a compact package size.

Further, future electric vehicles may have an 800V battery architecture, and may be not compatible with a 400V charger without inclusion of additional complex DC-DC converter circuits.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

SUMMARY

Figure 1:
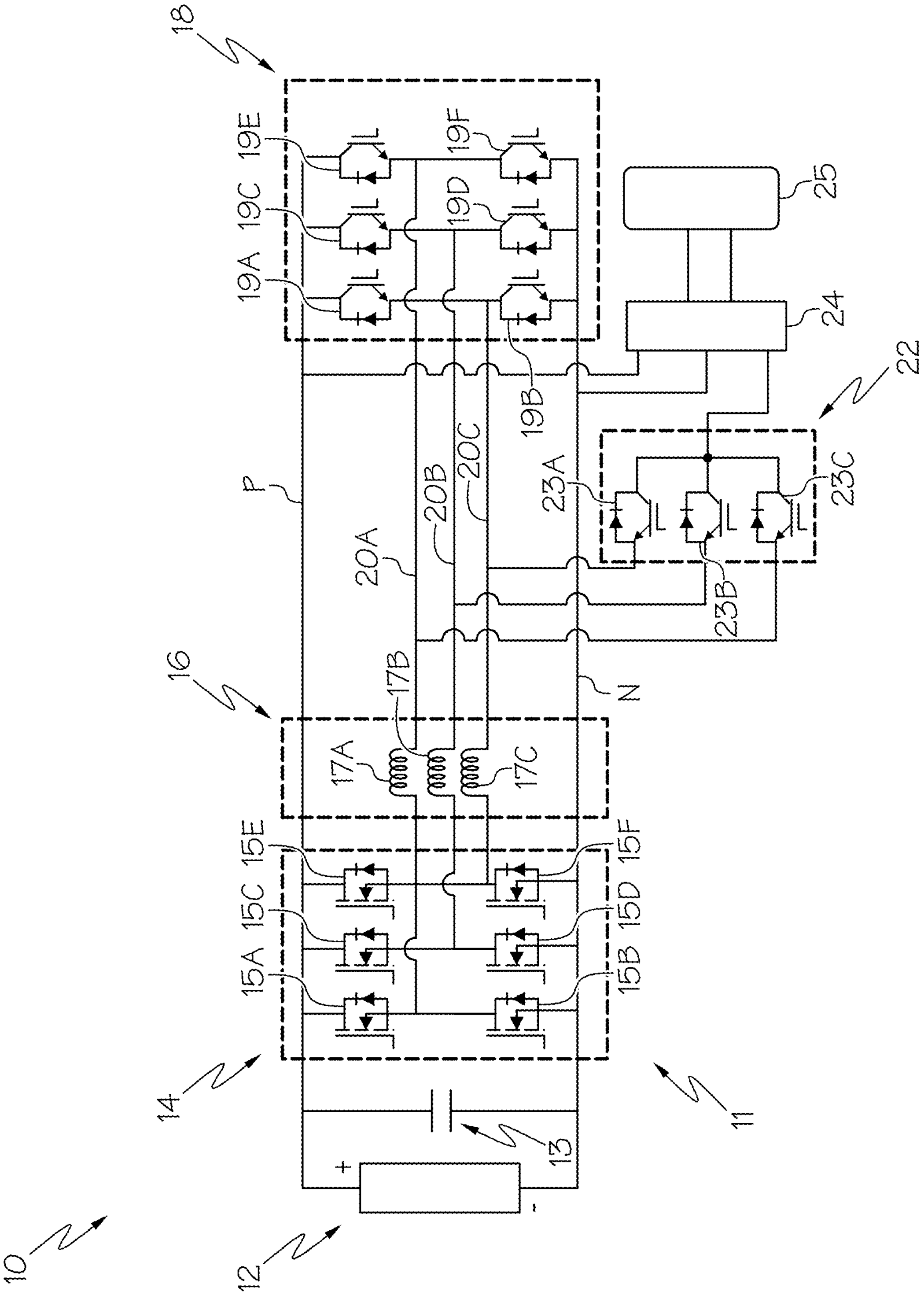
FIG. 1 schematically depicts an electric vehicle drive train system having a power electronics system, according to one or more embodiments shown and described herein.

In one embodiment, a power electronics system for an electric motor includes a first inverter package having a first housing defining a first enclosure and three metal-oxide-semiconductor field-effect transistor (MOSFET) pairs disposed within the first enclosure, wherein an output of each MOSFET of each MOSFET pair are coupled together and operable to be electrically coupled to a first end of a winding of the electric motor, and the MOSFET pairs are cooled by immersion within a dielectric cooling fluid. The power electronics system further includes a second inverter package having a second housing defining a second enclosure and three insulated-gate bi-polar transistor (IGBT) pairs disposed within the second enclosure, wherein an output of each IGBT of each IGBT pair are coupled together and operable to be electrically coupled to a second end of the winding of the electric motor, and the IGBT pairs are cooled by immersion within the dielectric cooling fluid. The power electronics system also includes a state selector circuit operable to selectively electrically couple the second ends of the windings of the electric motor together, and a charger input circuit operable to receive a first DC voltage, wherein the charger input circuit, the windings of the electric motor, and the MOSFET pairs of the first inverter package are operable to convert the first DC voltage to a second DC voltage, wherein the second DC voltage is greater than the first DC voltage.

In another embodiment, an electric drive train includes a battery, an electric motor having windings, and a power electronics system. The power electronics system includes a first inverter package having a first housing defining a first enclosure and three metal-oxide-semiconductor field-effect transistor (MOSFET) pairs disposed within the first enclosure. An output of each MOSFET of each MOSFET pair are coupled together and electrically coupled to a first end of an individual winding of the electric motor. The first housing includes a first inlet and a first outlet for receiving and removing a dielectric cooling fluid, to and from the first enclosure, respectively, such that the MOSFET pairs are cooled by immersion within the dielectric cooling fluid. The power electronics system also includes a second inverter package having a second housing defining a second enclosure and three insulated-gate bi-polar transistor (IGBT) pairs disposed within the second enclosure. An output of each IGBT of each IGBT pair are coupled together and electrically coupled to a second end of an individual winding of the electric motor. The second housing includes a second inlet and a second outlet for receiving and removing the dielectric cooling fluid to and from the second enclosure, respectively, such that the IGBT pairs are cooled by immersion within the dielectric cooling fluid. The power electronics system further includes a state selector circuit operable to selectively electrically couple the second ends of the windings of the electric motor together, and a charger input circuit operable to receive a first DC voltage, wherein the charger input circuit, the windings of the electric motor, the MOSFET pairs of the first inverter package are operable to convert the first DC voltage to a second DC voltage, and the second DC voltage is greater than the first DC voltage.

These and additional features provided by the embodiments described herein will be more fully understood in view of the following detailed description, in conjunction with the drawings.

DETAILED DESCRIPTION

Embodiments of the present disclosure are directed to power electronics systems having a chip-on-chip structure in a compact design that can be cooled by direct immersion within a cooling fluid. The power electronics systems also provide for two-inverter and state selector that enables operation in a low power mode and a high power mode, as well as the ability to charge at two different voltage levels (e.g., 400V and 800V) in a single circuit. More particularly, a state selector circuit is operated to place the power electronics system in a low power mode whereby an efficient metal-oxide-semiconductor field-effect transistors inverter is used to drive an electric motor in a close end winding operation, or a high power mode whereby the metal-oxide-semiconductor field-effect transistors inverter and a high power insulated-gate bi-polar transistors inverter both drive the electric motor. Further, the state selector circuit also enables the windings of the electric motor to be used as inductors in a DC-DC converter that boosts the input charger voltage from 400V (or other voltage) to 800V (or other voltage) of the battery such that the electric vehicle (or other device) can be selectively charged at two different charger voltages.

The power electronic systems described herein provide a compact and flexible solution for electrified vehicles having low cost/high performance benefits as well as compatibility between different ultra-fast charging voltage standards.

As used herein, the phrase "fully embedded" means that each surface of a component is surrounded by a substrate. For example, when a power electronics device assembly is fully embedded by a circuit board substrate, it means that the material of the circuit board substrate covers each surface of the circuit board substrate. A component is "partially embedded" when one or more surfaces of the component are exposed.

As used herein, the terms "first," "second," and "third" may be used interchangeably to distinguish one component from another and are not intended to signify location or importance of the individual components.

As used herein, the term "vertically" is used directionally to refer to the direction in which the substrate layers of a power electronic assembly are stacked and is generally represented by the Z direction of the depicted coordinate systems. The term "vertically" is not intended to reference an absolute vertical direction or a vertical direction with respect to a larger assembly in which the power electronic assembly may be included.

As used herein, the singular forms "a," "an," and "the" include plural referents unless the context clearly dictates otherwise. Thus, for example, reference to "a" component includes aspects having two or more such components, unless the context clearly indicates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Various embodiments of power electronics systems and electric drive train systems are described in detail below. Whenever possible, the same reference numerals will be used throughout the drawings to refer to the same or like parts.

Referring to FIG. 1, an electric drive train system 10 comprising a battery 12, an electric motor 16, and a power electronics system 11 for controlling the electric motor 16 is illustrated. The battery 12 produces an output voltage at some level, such as 400V or 800V, for example. The power electronics system 11 acts as inverter to produce three-phase AC voltage that is provided to three windings 17A, 17B, 17C of the electric motor 16 to drive the electric motor 16 and thus to propel an electric vehicle (or other machine).

As described in detail below, the power electronics system 11 comprises a power capacitor 13, a first inverter that operates as a low power inverter package 14, a second inverter that operates as a high power inverter package 18, a state selector circuit 22 to select between the two inverters, and a charging circuit including a relay 24. Each of the low power inverter package 14 and the high power inverter includes a half-H bridge per phase for a total of six switching power electronics devices. The outputs of the power electronics devices of each pair (i.e., each half-H bridge) are coupled together, thereby providing three outputs that are provided to the three windings 17A, 17B, 17C (collectively "windings 17") of the electric motor 16. Further, for each inverter, the positive terminals P are electrically coupled together and to the positive terminal of the battery 12, and the negative terminals N are coupled together and to the negative terminal of the battery 12. Therefore, the low power inverter package 14 and the high power inverter package 18 each include five power terminals: a P terminal, an N terminal, and three output terminals ("O terminal").

The six power electronics devices of the low power inverter package 14 are metal-oxide-semiconductor field-effect transistors (MOSFETs) 15A-15F (collectively "MOSFETs 15"), which are very efficient but do not operate and higher power levels such as insulated-gate bi-polar transistors (IGBTs). As a non-limiting example, the MOSFETs 15 may be fabricated from silicon carbide (SiC). SiC MOSFETs have a wide operating voltage range, low switching losses, a low on-state resistance, a high switching frequency, and a high maximum operating temperature. Accordingly, SiC MOSFETs are desirable for use in inverter circuits for electric motor and electric vehicle applications. However, SiC MOSFETs are not suitable for high power applications, such as when control of the electric motor demands high power, for example, when an electric vehicle is quickly accelerating or traveling up a grade.

The high power inverter package 18 is for use during high power demand scenarios. The high power inverter package 18 includes six IGBTs 19A-19F (collectively "IGBTs 19") capable of meeting the high power demands. The IGBTs 19 may be made of silicon, for example. Although not as efficient at MOSFETs, IGBTs can switch high current levels than MOSFETs.

Figure 2:
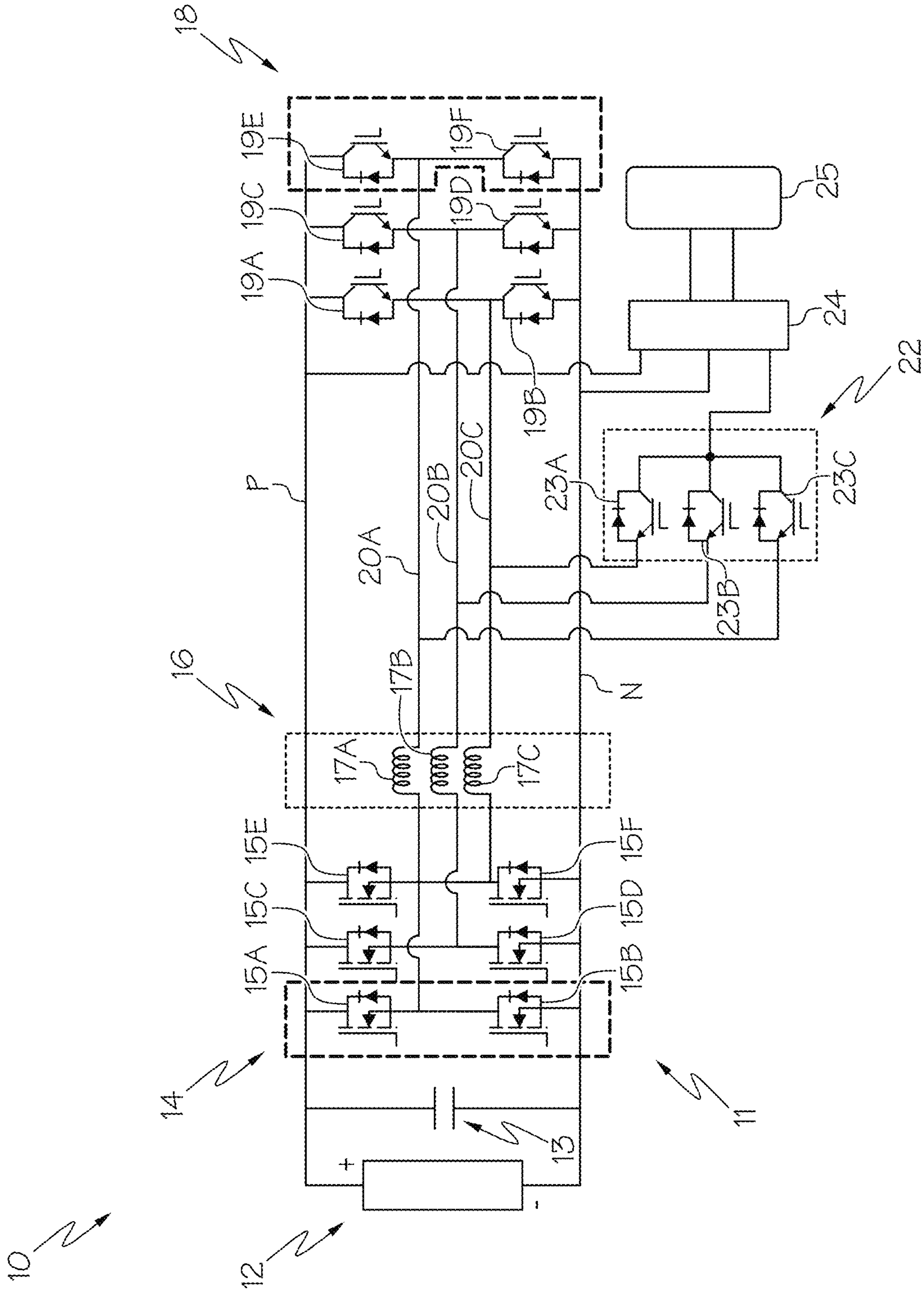
FIG. 2 schematically depicts the electric vehicle drive train system of FIG. 1 highlighting a MOSFET pair and an IGBT pair, according to one or more embodiments shown and described herein.
Figure 3:
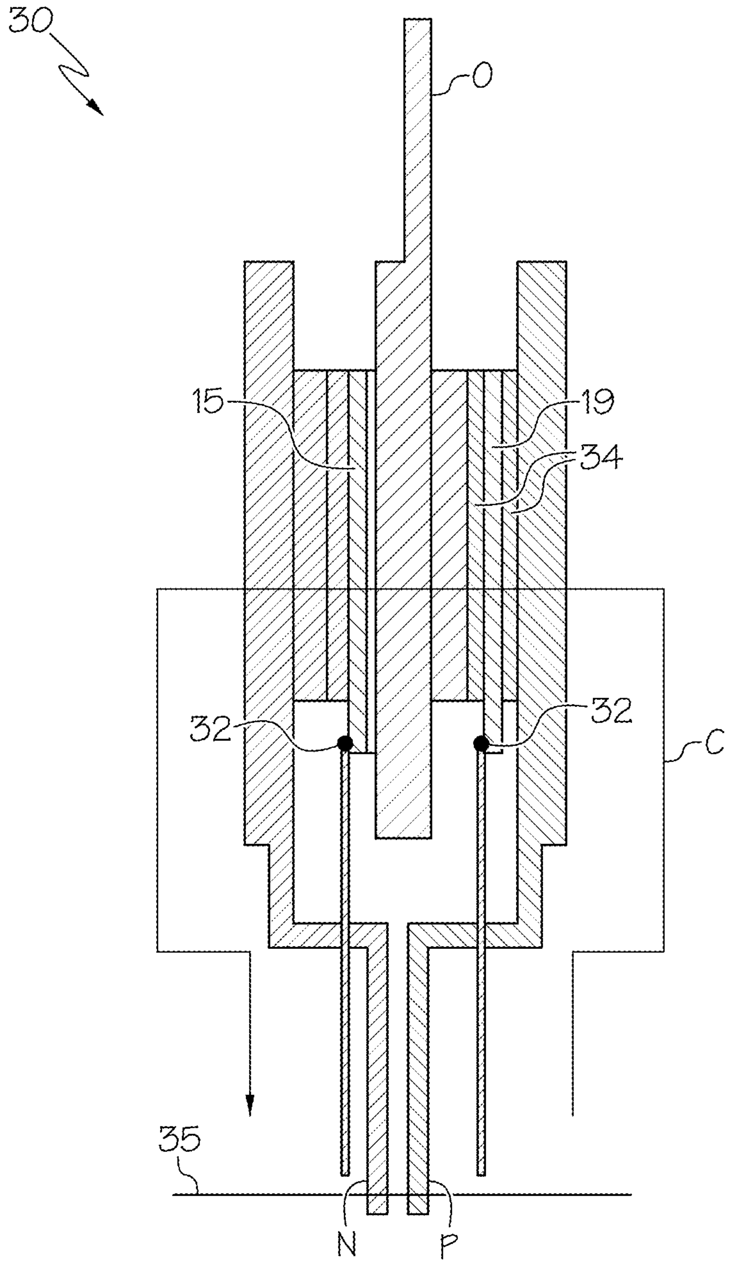
FIG. 3 schematically depicts a chip-on-chip arrangement of a MOSFET pair or an IGBT pair, according to one or more embodiments shown and described herein.

FIG. 2 highlights a single MOSFET 15 pair and a single IGBT pair 19 by dashed boxes. FIG. 3 illustrates example arrangement of both pair types. Therefore, FIG. 3 illustrates both the highlighted MOSFET 15 pair and the IGBT pair 19. In the illustrated example of FIG. 3, the MOSFETs 15/IGBTs 19 are arranged in a chip-on-chip configuration 30 such that their outputs face one another and are electrically coupled at a unified output terminal O. Each MOSFET 15/IGBT 19 of the pair is electrically coupled to a respective positive terminal P or a negative terminal N. For example, and without limitation, each MOSFET 15/IGBT 19 of the pair may be soldered 34 to the respective positive terminal P or the negative terminal N. Arrow C illustrates the current direction. The MOSFETs 15/IGBTs 19 are controlled by gate drive signals at gate terminals 32. Control of the MOSFETs 15/IGBTs 19 by the gate drive signals produces AC voltage at the output terminal O, which is electrically coupled to an individual winding 17 of the electric motor. A ceramic insulator 35 is also provided.

Referring once again to FIG. 1, the state selector circuit 22 comprises three switching devices 23A, 23B, 23C (collectively referred to as "switching devices 23"), which in the illustrated embodiment are illustrated as three IGBTs; however, other switching devices such as MOSFETs may be used.

The windings 17 may be electrically coupled to the switching devices 23 and/or the IGBTs 19 via connector lines 20A, 20B, 20C, or traces, respectively. The connector lines 20A, 20B, 20C may electrically couple other components of the power electronics system 11.

Figure 4:
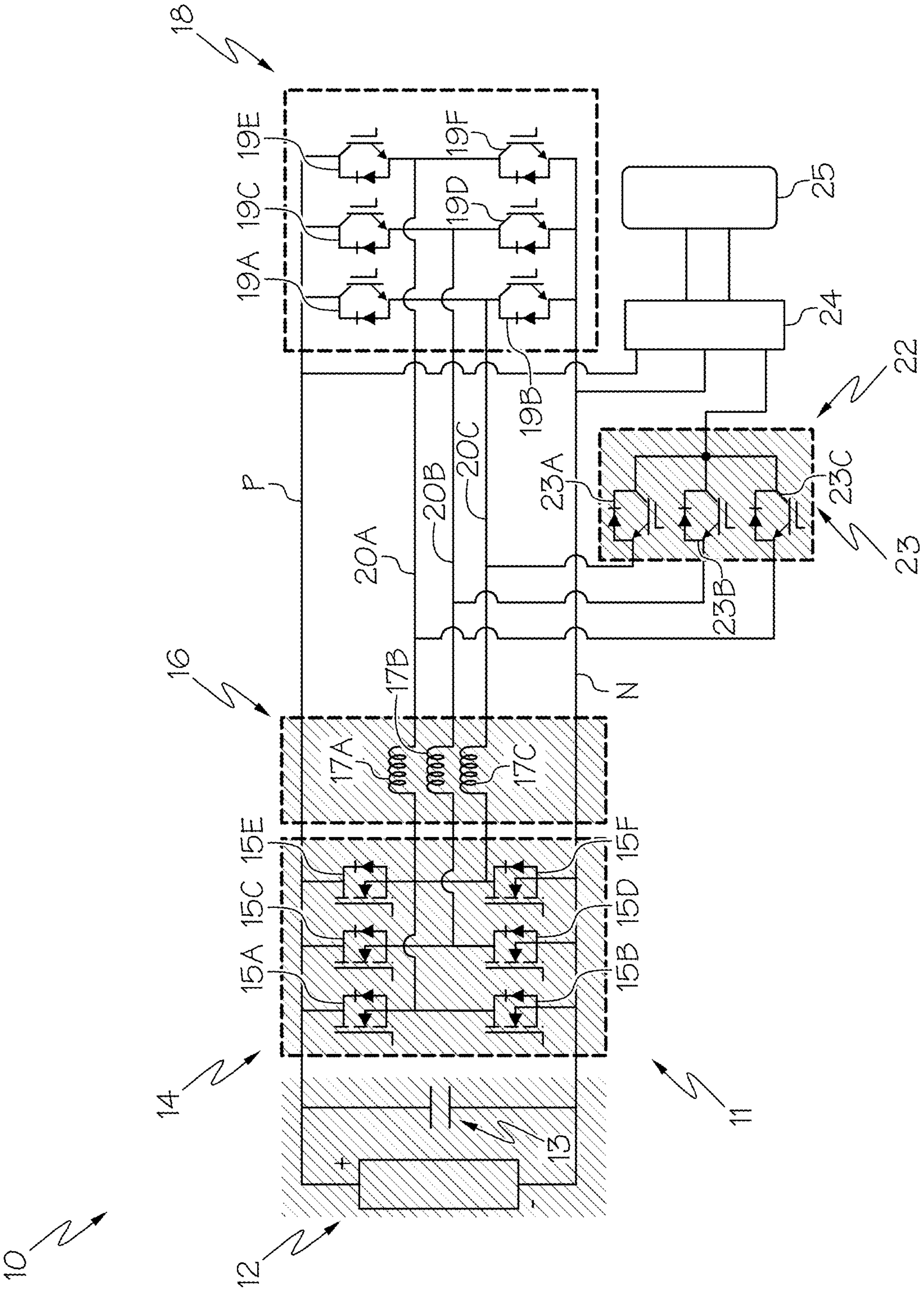
FIG. 4 schematically depicts the electric vehicle drive train system of FIG. 1 in a low power mode, according to one or more embodiments shown and described herein.

As stated above, the state selector circuit 22 is operable to switch between a low power mode and a high power mode for driving the electric motor 16. FIG. 4 illustrates the electric drive train system 10 when operated in a low power mode. The subcomponents that are highlighted with a hatch pattern are in an ON state (i.e., electrical current is flowing through them). In the low power mode, only the low power inverter package 14 is operating and on. When the system only needs low power, a control signal is provides to the gates of the switching devices 23 to turn them on. For example, in an electric vehicle a vehicle controller may send a control signal to the state selector circuit 22 when the low power mode is desired.

In the illustrated example, the emitter of each switching device 23 is coupled to a second end of an individual winding 17 of the electric motor 16. The collectors for the switching devices 23 are electrically coupled to one another. Thus, when the switching devices 23 of the state selector circuit 22 turn on, the seconds end of the windings 17 are electrically coupled to one another to provide a three-phase inverter motor system having a closed end winding. In the low power mode the second inverter circuit 18 is off and does not contribute to the control of the electric motor 16.

Figure 5:
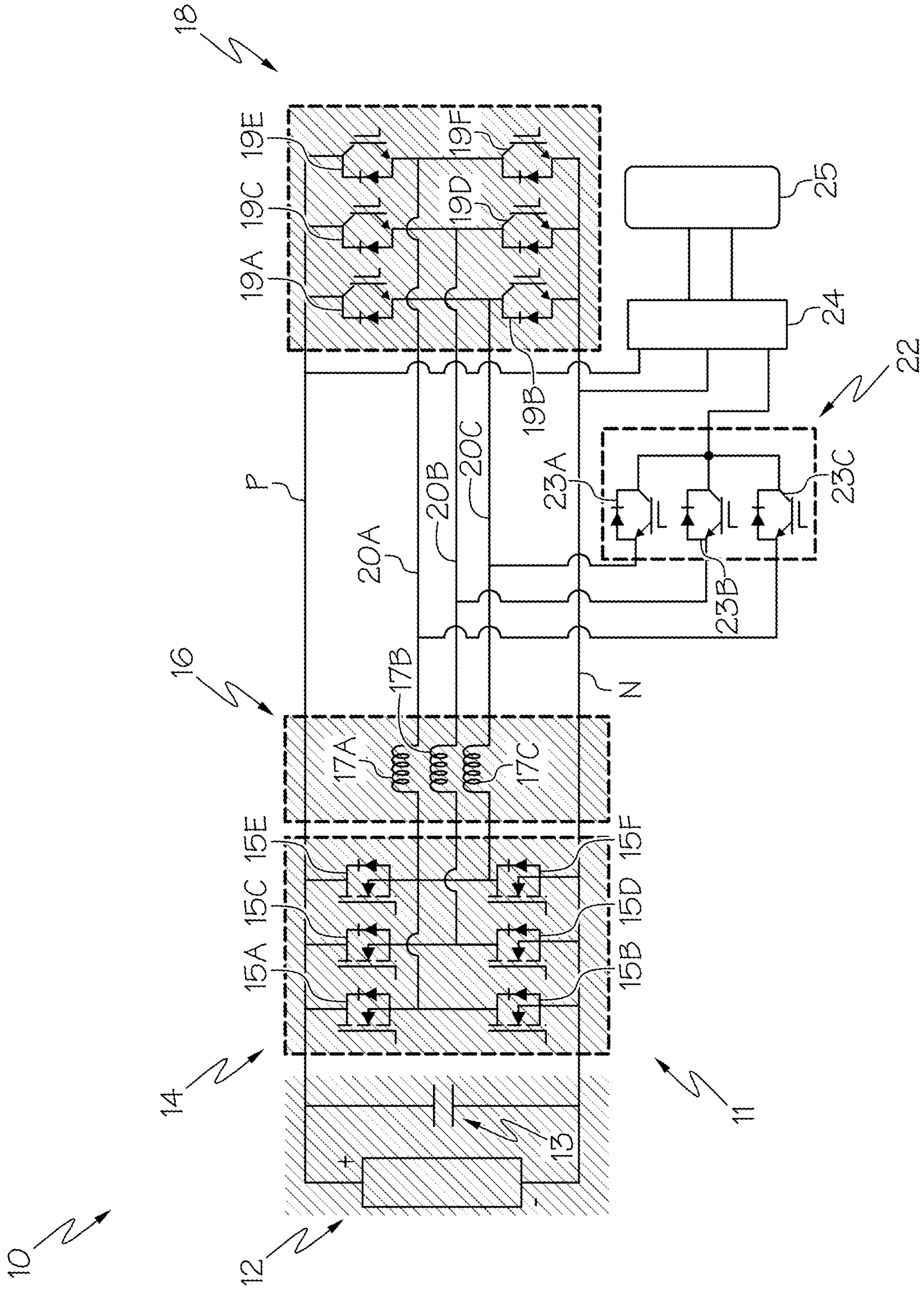
FIG. 5 schematically depicts the electric vehicle drive train system of FIG. 1 in a high power mode, according to one or more embodiments shown and described herein.

FIG. 5 illustrates the electric drive train system 10 when operated in a high power mode. The subcomponents that are highlighted with a hatch pattern are in an ON state (i.e. electrical current is flowing through them). In the high power mode the state selector circuit 22 is turned off as no control signal is provided to the gates of the switching devices 23. The electric motor 16 is now in an open-end winding mode that is operated by both the low power inverter package 14 and the high power inverter package 18. Thus, both the SiC MOSFETs 15 and the IGBTs 19 are operational, resulting in a high power output.

The power electronics systems 11 described herein are also capable of charging the battery 12 from two different voltage levels. Many electric vehicles operate at 400V architecture, and thus accept 400V to charge the battery 12. However, by doubling the voltage to 800V, the amount of time it takes to charge the battery 12 can be significantly reduced. Further, the wiring within the electric vehicle can be of thinner gauge due to the reduced current. However, many existing electric vehicle charging stations output less than 800V, such as 400V. These charging stations would not be compatible with an electric vehicle having an 800V architecture.

The power electronic systems 11 of the present disclosure allow a lower voltage charging station (e.g., 400V) to charge a vehicle having a higher voltage battery architecture (800V) by utilizing the windings 17 of the electric motor 16 as inductors in a DC-DC converter circuit.

Figure 6:
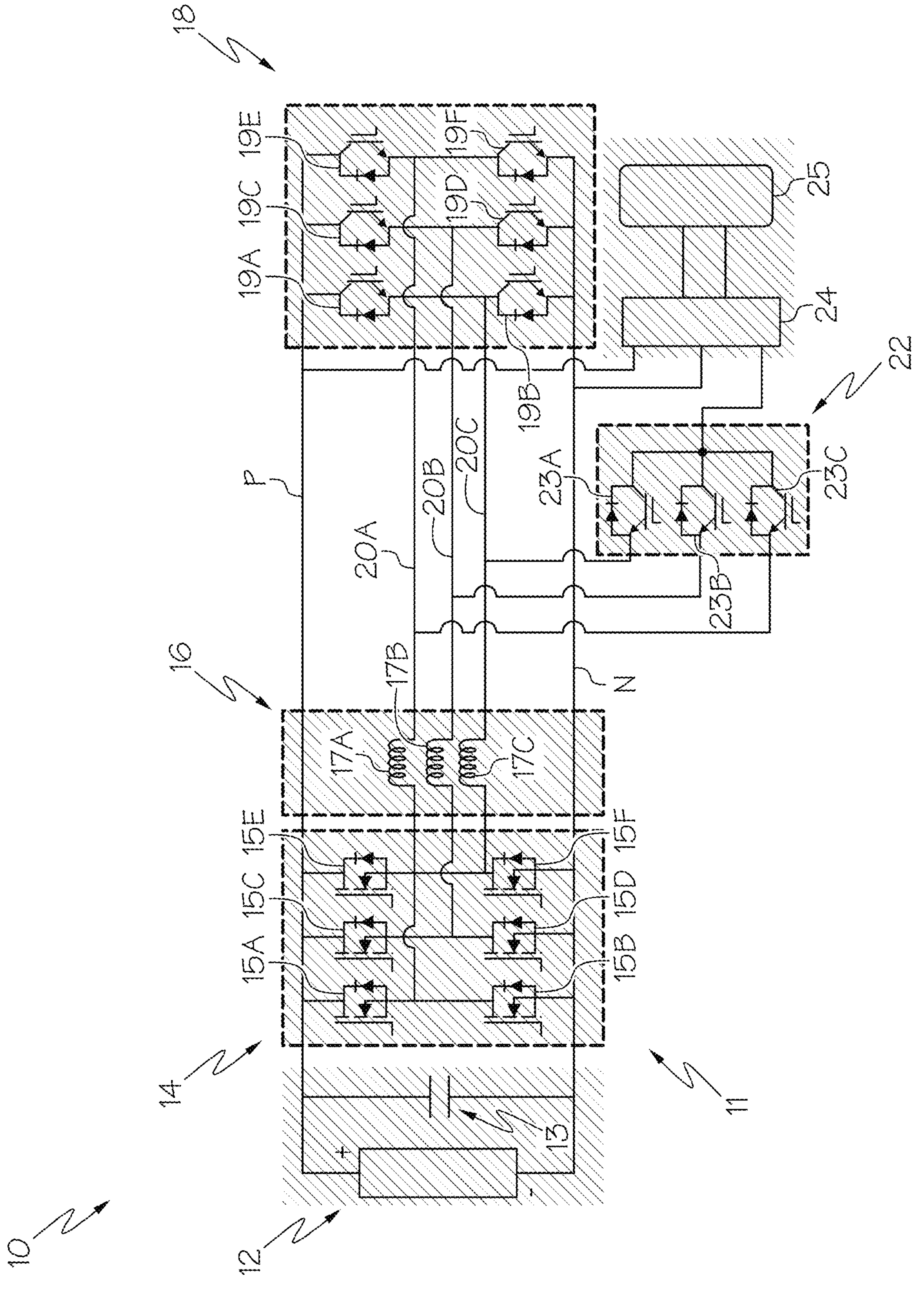
FIG. 6 schematically depicts the electric vehicle drive train system of FIG. 1 in a DC-DC converter mode, according to one or more embodiments shown and described herein.

FIG. 6 illustrates the power electronics system 11 in a DC-DC converter mode (i.e., a charging mode) where the input voltage is less than the voltage of the battery 12. The subcomponents that are highlighted with a hatch pattern are in an ON state (i.e., electrical current is flowing through them). Gate drive signals are provided to the switching devices 23 of the state selection circuit 22 to turn them on, which couples the second ends of the windings 17 together. The charger input circuit includes a relay 24 that has a terminal electrically coupled to the collectors of the switching devices 23 (e.g., IGBTs), and a switched terminal that is connected to the positive terminal of the battery 12. In the DC-DC converter mode, the relay 24 electrically connects the collectors of the switching devices 23, and therefore the second ends of the windings 17, to the positive terminal of the battery 12. The relay also connects the positive terminal and the negative terminal of the charger 25 to the positive terminal and negative terminal of the battery 12, respectively. The windings 17 of the electric motor 16 act as inductors for the DC-DC converter circuit, which boost the voltage from the lower voltage of the charger 25 (e.g., 400V) to a higher voltage of the battery 12 (e.g., 800V).

The electric vehicle may sense the input voltage of the charger 25, and turn on the state selector circuit 22 if the voltage should be boosted based on sensed voltage. If the voltage of the charger does not need to be boosted then the state selector circuit is turned off. In this manner, a battery 12 could be charged by a 400V charging station if an 800V charging station is not available.

Figure 7:
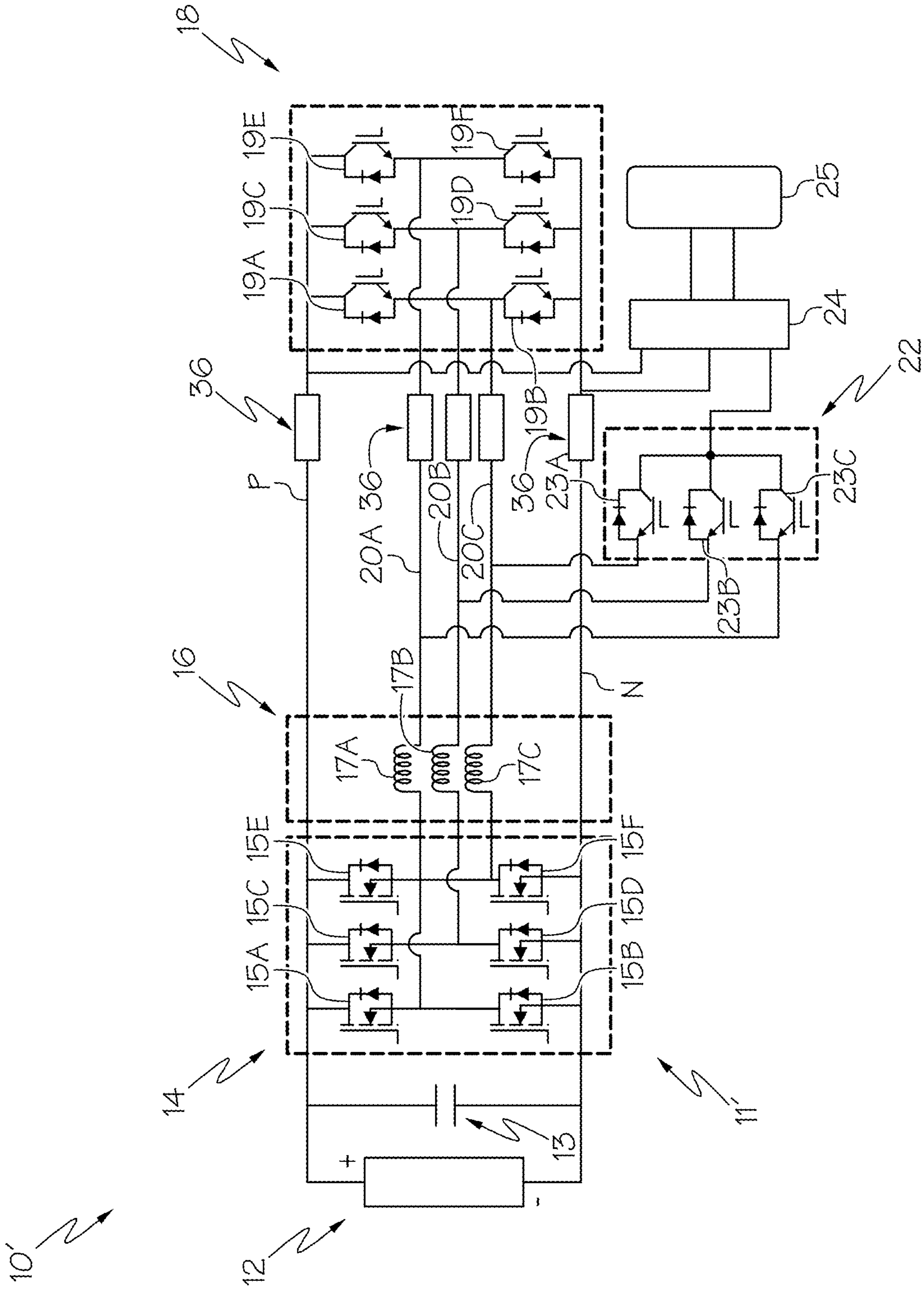
FIG. 7 schematically depicts another electric vehicle drive train system having a power electronics system with relays, according to one or more embodiments shown and described herein.

Referring now to FIG. 7, another electric drive train system 10' having a power electronics system 11' is illustrated. To increase reliability, the power electronics system 11' includes relays 36 added within the current flow path to the high power inverter package 18. A positive relay 36 is provided between the positive terminal of the battery 12 and the positive terminal of the high power inverter package 18. Three output relays 36 are provided between the outputs of the high power inverter package 18 and the second end of the windings 17 of the electric motor 16. A negative relay is provided between the negative terminal of the battery 12 and the negative terminal of the high power inverter package 18.

In the event that the high power inverter package 18 failed, the relays 36 could be turned off to isolate the high power inverter package 18. Concurrently, the state selector circuit 22 will be in an ON state so that the electric vehicle (or other device) may be operated only by the low power inverter package 14.

Figure 8:
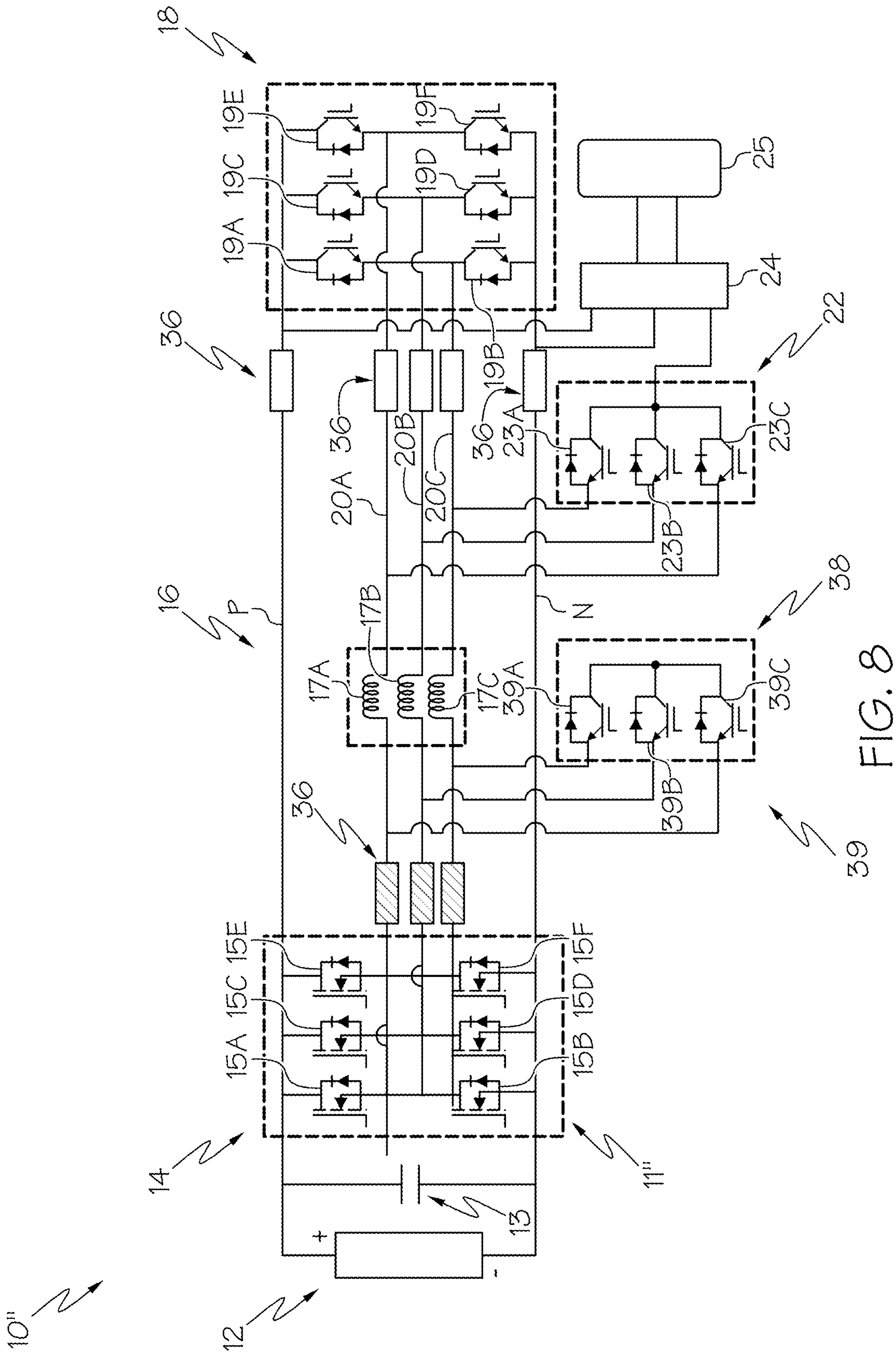
FIG. 8 schematically depicts another electric vehicle drive train system having a power electronics system with additional relays, according to one or more embodiments shown and described herein.

FIG. 8 illustrates another electric drive train system 10" having a power electronics system 11". To further increase reliability, this power electronics system 11" has three additional output relays 36 positioned between the outputs of the low power inverter package 14 and the first ends of the windings 17 of the electric motor 16. The example power electronics system 11" further includes a second state selector circuit 38 that is operable to electrically couple the first ends of the windings 17 of the electric motor 16. More particularly, the second state selector circuit 38 comprises switching devices 39A, 39B, 39C (collectively "switching devices 39") configured as IGBTs or another switching device, such as MOSFETs. The emitters of the switching devices 39 are electrically coupled to the first ends of the windings 17 of the electric motor 16. In the event of failure of the low power inverter package 14, the additional relays 36 coupled to it can turn off, and the second state selector circuit 38 can turn on to couple the first ends of the windings 17 together to provide a closed-end winding operating mode for the electric motor 16. In this state the electric vehicle (or other device) may be operated by the high power inverter package 18 only.

Figure 9:
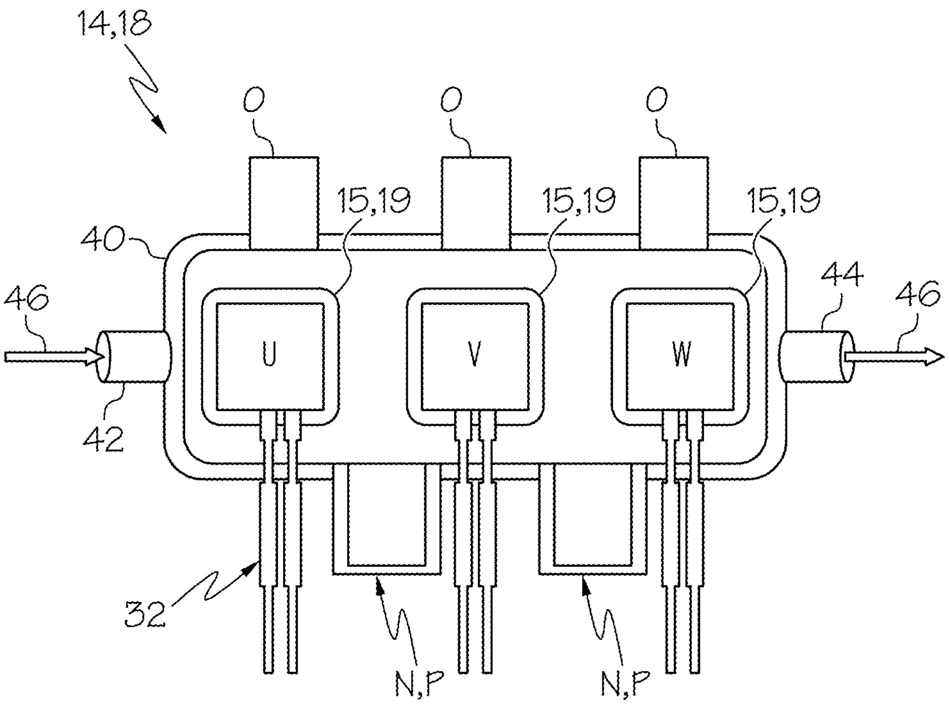
FIG. 9 schematically depicts an example inverter package, according to one or more embodiments shown and described herein.

Referring now to FIG. 9, an example inverter package 14, 18 is illustrated. The example inverter package 14, 18 includes a housing 40 defining an enclosure in which the switching devices (MOSFETs 15, IGBTs 19) are disposed. The housing defines an inlet port 42 and an outlet port 44. The inverter package 14, 18 is cooled by direct immersion into a dielectric cooling fluid, such as, without limitation, oils, hydrocarbons and fluorocarbons, such as dielectric coolants sold by Engineered Fluids of Tyler TX. Cooling fluid 46 flows into the enclosure from the inlet port 42, flows by the chip-on-chip arrangements of the switching devices where it gathers heat, and flows out through the outlet port 44. Although not shown, fluid lines couple the inlet port 42 and the outlet port 44 to other system components, such as a pump, a heat exchanger, and a fluid reservoir.

Figure 10:
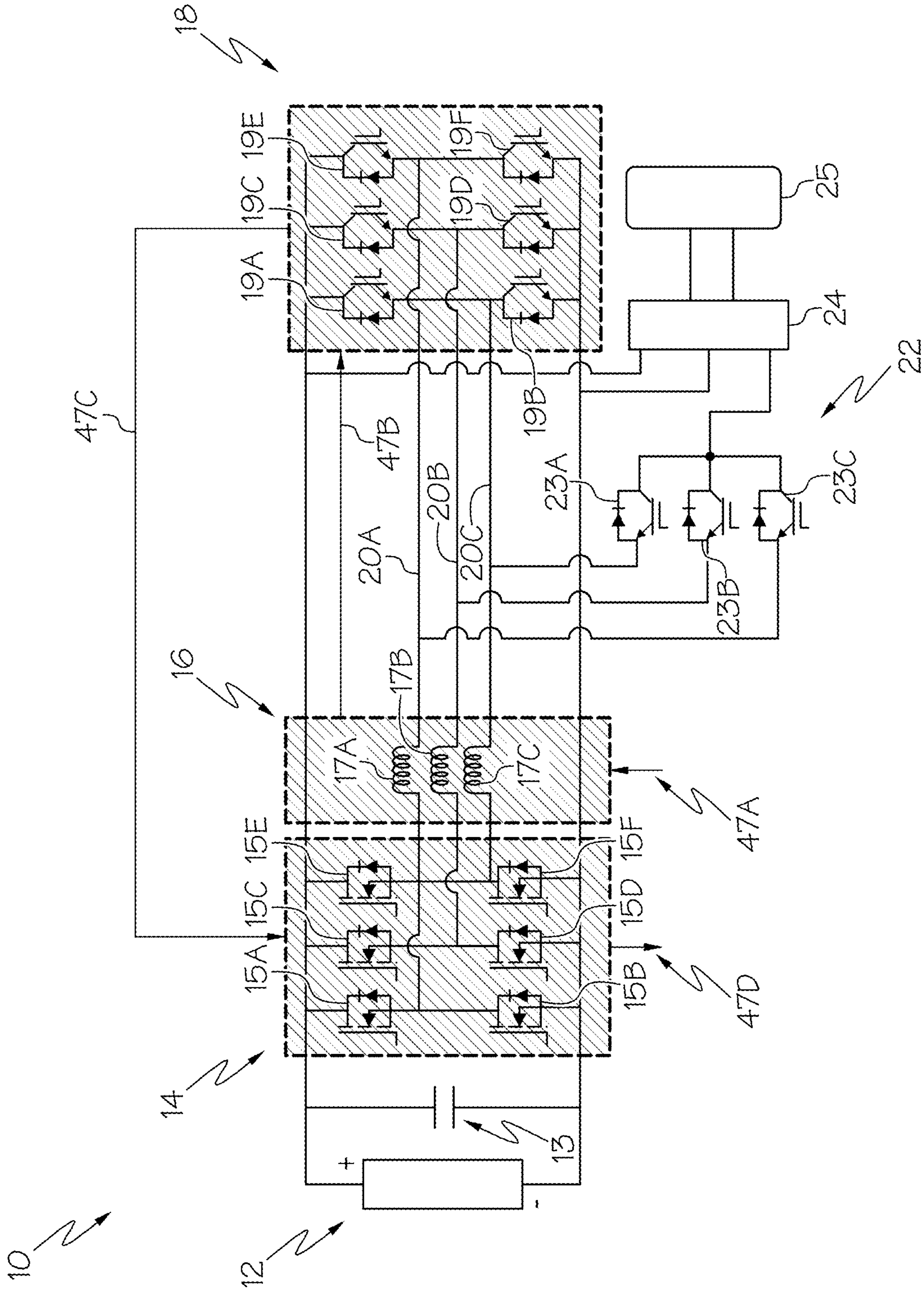
FIG. 10 schematically depicts an example cooling path for a cooling fluid for the example inverter package of FIG. 9, according to one or more embodiments shown and described herein.

The low power inverter package 14, the high power inverter package 18 and the electric motor 16 may be all cooled by the same cooling fluid in a series cooling path. Referring to FIG. 10, an example cooling path for the cooling fluid is illustrated by arrows 47A-47D. Based on different cooling temperature requirements of the various components, the cooling fluid loop may start at arrow 47A where it first enters the electric motor 16, flows into the high power inverter package 18 at arrow 47B, flows into the low power inverter package 14 at arrow 47C, and then exits the low power inverter package 14 at arrow 47D where it may then be routed to a heat exchanger (not shown) to be cooled. This route may be advantageous because the IGBTs 19 of the high power inverter package 18 typically have a maximum operating temperature of 150 degree C. and the MOSFETs 15 of the low power inverter package 14 typically have a maximum operating temperature of 175 degrees C.

There are at least two possible flow path configurations. In Configuration 1, the cooling fluid first flows through the high power inverter package 18 before flowing through the low power inverter package 14, such as the route shown in FIG. 10. As another example of Configuration 1, the cooling fluid flow path may be: high power inverter package 18 into the low power inverter package 14 and then into the electric motor 16. As another example of Configuration 1, the cooling fluid flow path may be: high power inverter package 18 into the electric motor 16 and then into the low power inverter package 14. The reason to utilize a flow path according to Configuration 1 is to cause the silicon IGBTs to operate at a lower temperature than the SiC MOSFETs.

In Configuration 2, the cooling fluid first flows through the low power inverter package 14 before flowing through the high power inverter package 18. In a first example of Configuration 2, the cooling fluid flow path may be: low power inverter package 14 into the high power inverter package 18 and then into the electric motor 16. In a second example of Configuration 2, the cooling fluid flow path may be: low power inverter package 14 into the electric motor and then into the high power inverter package 18. In a third example of Configuration 2, the cooling fluid flow path may be: the electric motor 16 into the low power inverter package 14 and then into the high power inverter package 18.

In Configuration 2, the IGBTs 19 of the high power inverter package 18 have temperature sensor(s) while the MOSFETs 15 of the low power inverter package do not include temperature sensor(s). Not including temperature sensor(s) for the MOSFETs may reduce the overall cost of the power electronics system 10. By passing the cooling fluid through the low power inverter package 14 before the high power inverter package 18, it is ensured that the MOSFETs 15 of the low power inverter package 14 will be operated at a temperature that is lower than the IGBTs 19 of the high power inverter package 18. Therefore, temperature sensors of the low power inverter package 14 may be eliminated to save costs.

Various embodiments of chip-on-chip power electronics assemblies defining the low power inverter package 14 and the high power inverter package 18 will now be described.

Figure 11:
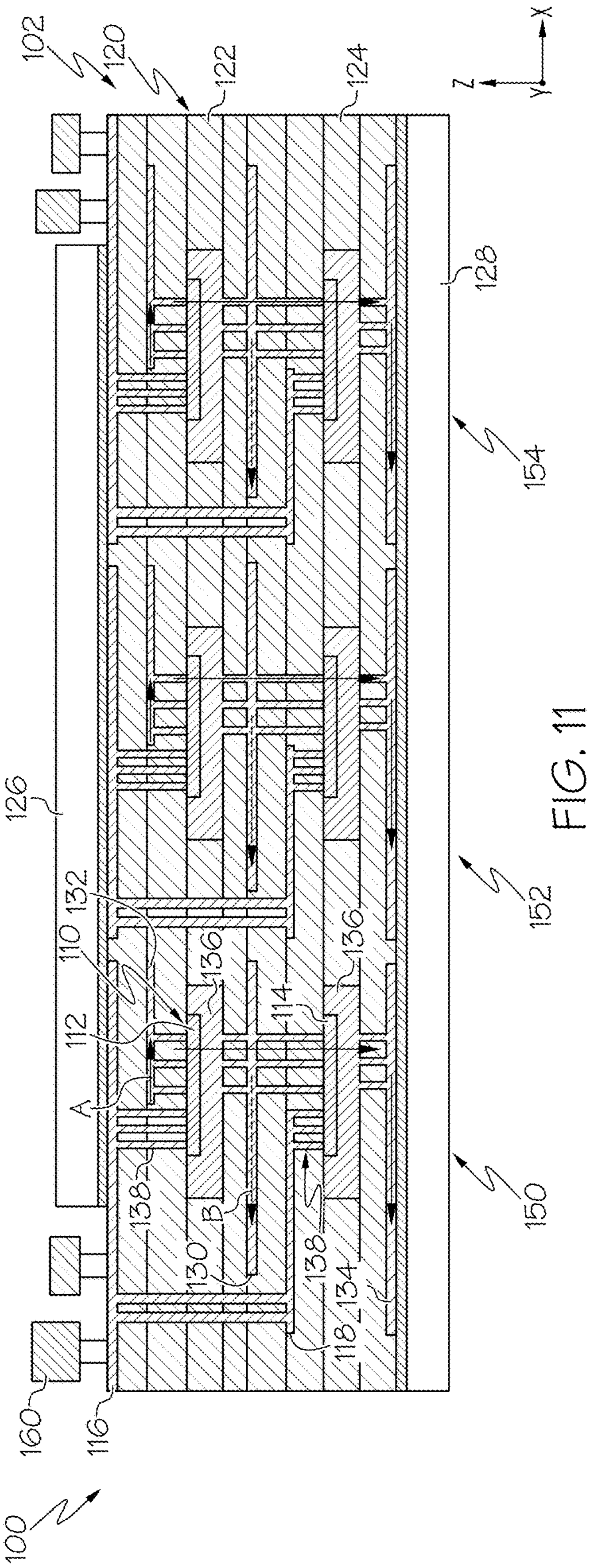
FIG. 11 schematically depicts a power electronic assembly, according to one or more embodiments shown and described herein.

Referring to FIG. 11, an example power electronic assembly 100 is schematically depicted. The power electronic assembly 100 may be the low power inverter package 14 and/or the high power inverter package 18 described above. The power electronic assembly 100 may include a printed circuit board 102 (i.e., a first inverter circuit board or a second inverter circuit board) comprising a plurality of substrate layers 120 stacked in a vertical direction (e.g. in the Z-axis direction of the depicted coordinate system). The plurality of substrate layers 120 may be made from a dielectric material, such as FR-4, for example. As depicted, the power electronic assembly 100 may include eight individual substrate layers 120. However, a greater or fewer number of substrate layers 120 is contemplated and possible.

Embedded within the plurality of substrate layers 120 are a plurality of electrical components 110 that generate excess heat during operation that should be removed. The electrical components 110 may be the SiC MOSFETs 15 and/or the IGBTs described above. The electrical components 110 may be fully embedded within the substrate layers such that the electrical components 110 are surrounded on all sides by the substrate layers 120. As depicted, each of the electrical components 110 may be mounted on an electrically conductive mounting substrate 136 within the substrate layers 120. In some embodiments, the electrical components 110 may be mounted generally on the top of and within a recess of mounting substrate 136. As depicted, in some embodiments, the power electronic assembly 100 may have six electrical components 110 that define an inverter circuit, such as an inverter circuit of an electrified vehicle; however, other quantities of electrical components 110 are contemplated and possible.

Figure 12A:
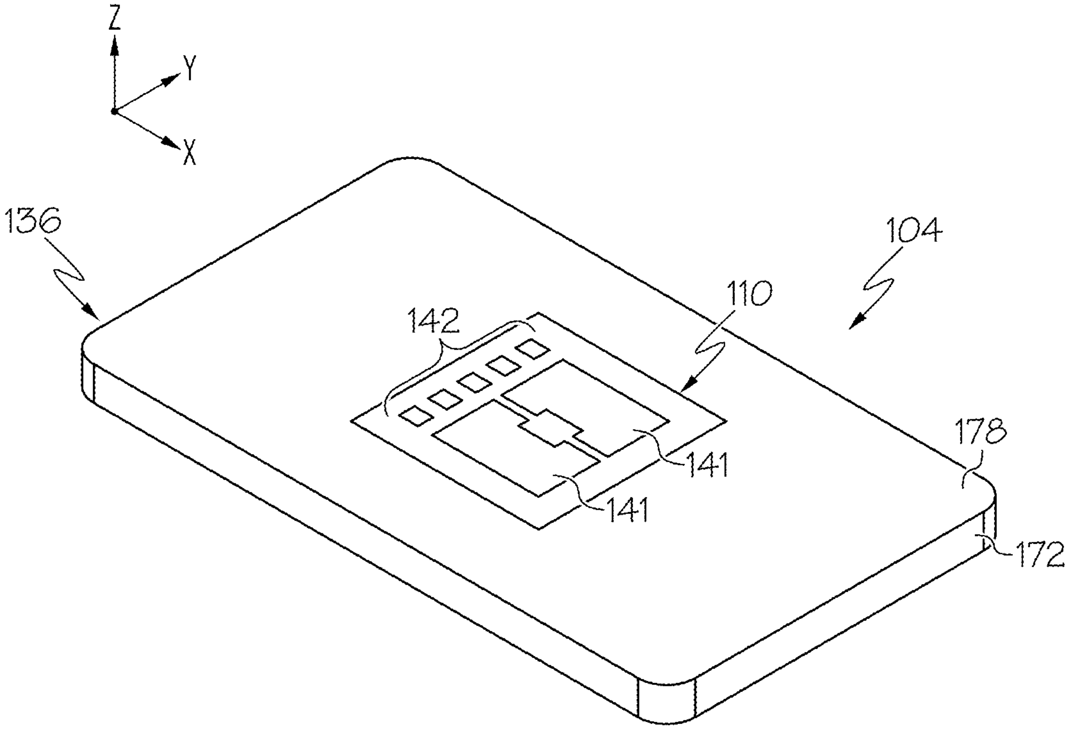
FIG. 12A schematically depicts a subassembly of the electrical component and the mounting substrate of the power electronic assembly of FIG. 11, according to one or more embodiments shown and described herein.
Figure 12B:
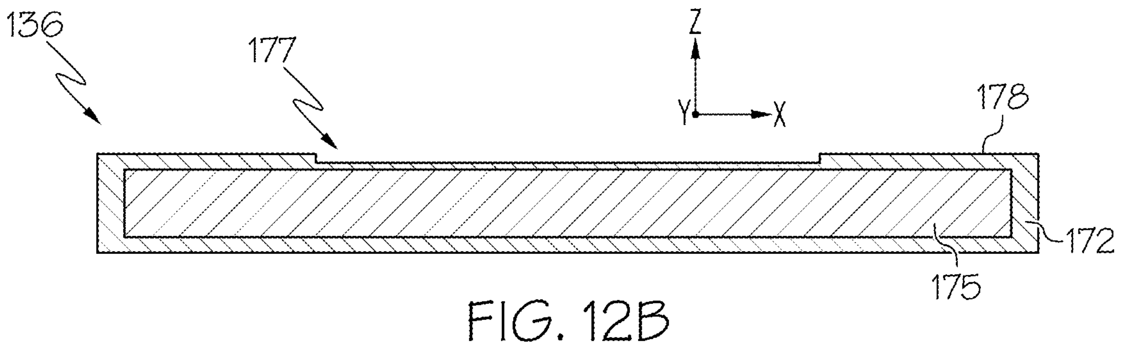
FIG. 12B schematically depicts the mounting substrate of the subassembly of FIG. 12A, according to one or more embodiments shown and described herein.

FIGS. 12A and 12B illustrate an example subassembly 104 of the electrical component 110 and the mounting substrate 136 in a top perspective view and a cross-sectional view, respectively. The subassembly 104 illustrated by FIGS. 12A and 12B includes an internal graphite layer 175 that is encapsulated by a metal layer 172. Together, the internal graphite layer 175 and metal layer 172 may make up the mounting substrate 136. The metal layer 172 includes a surface 178 having a recess 177 with dimensions to receive the electrical component 110. As described in more detail below, the metal layer 172 provides an electrically conductive surface 178 to which electrically conductive vias may contact to make an electrical connection to electrodes on a bottom surface of the electrical component 110. The example electrical component 110 is illustrated as having top electrodes 141 for passing switched current as well as a plurality of signal electrodes 142 for controlling the electrical component. The recess 177 may be formed by chemical etching, for example. The metal layers 172 may be made of any suitable metal or alloy. Copper and aluminum may be used as the metal layer 172 as non-limiting examples. Additional features of the subassembly 104 are described in U.S. patent application Ser. No. 17/874,462, titled Power Electronics Assemblies Having Embedded Power Electronics Devices and filed on Jul. 27, 2022, which is hereby incorporated by reference herein in its entirety. It should be understood that the mounting substrate 136 may take on other configurations.

Referring back to FIG. 11, in some embodiments, the substrate layers 120 may include a first core layer 122 in which a first electrical component 112 is embedded and a second core layer 124 in which a second electrical component 114 is embedded. The first core layer 122 may be stacked vertically above the second core layer 124, and the first electrical component 112 and the second electrical component 114 may be aligned such that the first electrical component 112 and the second electrical component 114 form a first vertical column 150 along the Z-axis. In some embodiments, the plurality of electrical components 110 may be arranged to form multiple vertical columns. For example, as depicted the power electronic assembly 100 may include six electrical components 110 arranged in the first vertical column 150, a second vertical column 152, and a third vertical column 154. In other embodiments, the power electronic assembly 100 may include a larger or smaller quantity of electrical components 110 which may be arranged in a larger or smaller quantity of columns.

Still referring to FIG. 11, disposed between the first core layer 122 and the second core layer 124 may be a first power layer 130. The first power layer 130 is an AC output layer comprising conductive material, such as copper, which may be electrically coupled to an output terminal that is further electrically coupled to a load, such as an electric motor. Accordingly, a first electrical component 112 and the second electrical component 114 may be in electrical communication with the first power layer 130 such that the first electrical component 112 and the second electrical component 114 supply an AC output to the output terminal.

The power electronic assembly 100 includes a second power layer 132 which may be a positive layer comprising conductive material, such as copper, which may electrically couple the second power layer 132 to a positive terminal of a DC source, such as a battery. As depicted, in some embodiments, the second power layer 132 may be arranged vertically above the first core layer 122 and the second core layer 124. The power electronic assembly 100 includes a third power layer 134 which may be a negative layer (i.e., a ground layer) comprising conductive material, such copper, which may electrically couple the third power layer 134 to a negative terminal of a DC source, such as a battery. As depicted, in some embodiments, the third power layer 134 may be arranged vertically below the first core layer 122 and the second core layer 124. Disposed between the core layers 122, 124 and the power layers 130, 132, 134 may be a plurality of conductive vias 138 extending in the vertical direction (e.g. the Z-axis direction of the depicted coordinate system), which may electrically couple each of the core layers 122, 124 to each of the power layers 130, 132, 134. In this way, electrical current may travel through the core layers and to the electrical components 110. In particular, an electrical current may originate at a positive terminal, travel through the second power layer 132, through the first electrical component 112, through the second electrical component 114, and through the third power layer 134 to a negative terminal as shown by the depicted arrows A and B, where arrow A indicates the DC current flow, arrow B indicates the AC output generated by the electrical components 110.

The power electronic assembly 100 may include a plurality of signal layers configured to transmit an electric signal such as a first signal layer 116 and a second signal layer 118 to control the electrical components 110 (i.e., switch them on and off). The first signal layer 116 and the second signal layer 118 may be separated by one or more core layers and/or power layers which may prevent cross-talk between the first signal layer 116 and the second signal layer 118. As depicted, in some embodiments, the first signal layer 116 may be disposed vertically above the first core layer 122. The second signal layer 118 may be disposed between the first core layer 122 and the second core layer 124.

The second signal layer 118 may be electrically coupled to the first signal layer 116 via the conductive vias 138. In this way, the second signal layer 118 may receive a signal from one or more mounted electronics 160 mounted on the first signal layer 116, as described in greater detail herein. The first signal layer 116 may be electrically coupled to the first core layer 122, and the second signal layer 118 may be electrically coupled to the second core layer 124 by the conductive vias 138. In this way, the first electrical component 112 and the second electrical component 114 may be in communication with the one or more mounted electronics 160 via the first signal layer 116 and the second signal layer 118, respectively.

The power electronic assembly 100 may include one or more mounted electronics 160. The one or more mounted electronics 160 may include resistors, capacitors, inductors, gate drive components, or other components. In embodiments, the one or more mounted electronics 160 may be mounted to a top surface of the printed circuit board 102. The one or more mounted electronics 160 may be electrically coupled to the first signal layer 116. In this way, the one or more mounted electronics 160 may be in communication with the electrical components (e.g., the first electrical component 112 and the second electrical component 114 of the pair of electrical components in the vertical column 150) via the first signal layer 116, the second signal layer 118, and the conductive vias.

Although the power layers 130, 132, 134 and the signal layers 116, 118 are described primarily in relation to the first electrical component 112 and the second electrical component 114 of the first vertical column 150, it should be understood that the descriptions apply equally to the electrical components of the second vertical column 152 and the third vertical column 154. In other words, the first electrical component 112 and the second electrical component 114 of each of the vertical columns 150, 152, 154 may receive a DC input via the second power layer 132 and may supply an AC output via the first power layer 130. Similarly, the first electrical component of each of the vertical columns 150, 152, 154 may communicate with the one or more mounted electronics 160 via the first signal layer 116. As depicted, the first vertical column 150, the second vertical column 152 and the third vertical column 154 may be similar. However, the first vertical column 150, the second vertical column 152 and the third vertical column 154 need not be the same. In some embodiments, there may be variation between the first vertical column 150, the second vertical column 152 and the third vertical column 154.

Still referring to FIG. 11, the power electronic assembly 100 may include a first cooling plate 126 and a second cooling plate 128. The first cooling plate 126 and the second cooling plate 128 may each be comprised of a thermally conductive material such that the first cooling plate 126 and the second cooling plate 128 are configured to pull heat away from the printed circuit board 102. In this way, the first cooling plate 126 and the second cooling plate 128 may decrease the temperature of the printed circuit board 102 via conduction. In some embodiments, the first cooling plate 126 and the second cooling plate 128 may be made from copper, aluminum, graphite, composite materials, or other thermally conductive material.

As depicted, in embodiments, the first cooling plate 126 may be arranged on a first side of the printed circuit board 102. The second cooling plate 128 may be arranged one a second side of the printed circuit board 102 opposite the first side. In this way, heat generated by the electrical components 110 may be drawn from the printed circuit board 102 in two direction (i.e., the +Z-axis direction and the −Z-axis direction of the depicted coordinate system). In some embodiments, the first cooling plate 126 may directly abut the first signal layer 116, and the second cooling plate 128 may directly abut the third power layer 134, as depicted.

In some embodiments, in addition or in alternative to the first cooling plate 126 and the second cooling plate 128, the power electronic assembly 100 may include one or more convective cooling elements, such as fans or liquid impingement cooling flows. In some embodiments, the printed circuit board 102 may be submersed within a cooler or submerged in a cooling fluid.

In light of FIG. 11, it will be appreciated that arrangement of the electrical components 110 within the printed circuit board 102 may increase the power density of the power electronic assembly 100. Specifically, by fully embedding the electrical components 110 within the substrate layers 120 and by stacking the electrical components 110 such that the electrical components 110 are positioned in vertical columns, the power density may be increased. In particular, the arrangement of the power electronic assembly 100 may enable both decrease in size of the printed circuit board 102 and a decrease in inductance. The first cooling plate 126 and the second cooling plate 128 may be arranged on a first and a second side of the printed circuit board 102, respectively, and may dissipate heat from the printed circuit board 102 and prevent overheating of the printed circuit board 102 due to the increased power density.

Figure 13:
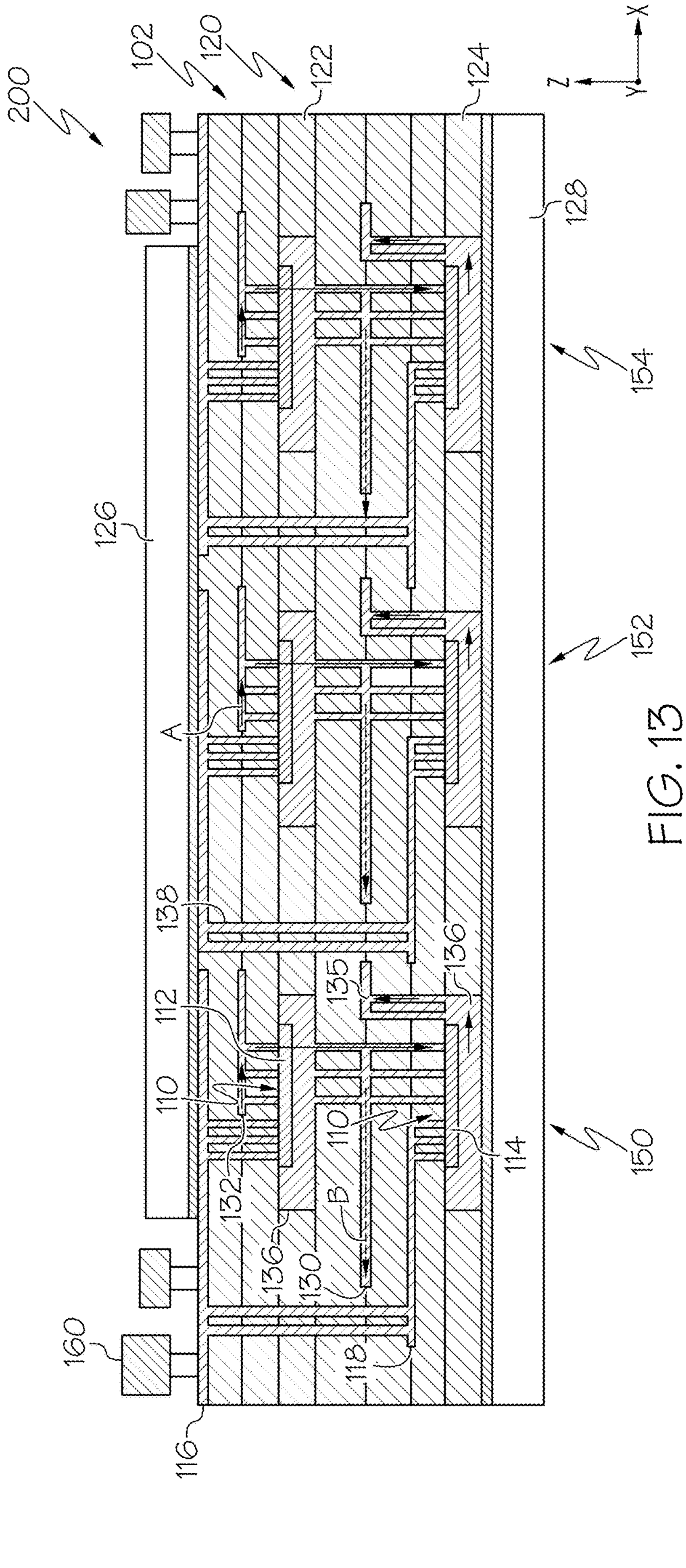
FIG. 13 schematically depicts another power electronic assembly, according to one or more embodiments shown and described herein.

Referring now to FIG. 13, an embodiment of a power electronic assembly 200 is schematically depicted. The power electronic assembly 200 is similar to the power electronic assembly 100. Accordingly, like numbers will be used to refer to like features. For example, the power electronic assembly 200 may include a first electrical component 112 and a second electrical component 114 arranged in a first vertical column 150.

The power electronic assembly 200 may include a first power layer 130 disposed between the first core layer 122 and the second core layer 124. The first power layer 130 may be configured as the output layer that is coupled to an output terminal that is further electrically coupled to a load, such as an electric motor. The first electrical component 112 and the second electrical component 114 of the first vertical column 150 may be in electrical communication with the first power layer 130 such that the first electrical component 112 and the second electrical component 114 supply an AC output. Portions 135 of the first power layer 130 may additionally be configured as a negative layer (i.e., a ground layer) connecting the first electrical component 112 and the second electrical component 114 to a negative terminal. In other words, the first power layer 130 may comprise conductive material connecting the first electrical component 112 and the second electrical component 114 to the output terminal and separate conductive material connecting the first electrical component 112 and the second electrical component 114 to the negative terminal. It is noted that the portions 135 of the first power layer 130 couple to the negative terminal extend along the Y-axis. Accordingly, the power electronic assembly 200 may have fewer substrate layers 120 as compared to embodiments having distinct power layers for electrical connection to the ground terminal and to the negative terminal.

The power electronic assembly 200 may include a second power layer 132 that is substantially similar to the second power layer 132 described with reference to FIG. 11, hereinabove. Specifically, the power electronic assembly 200 may have a second power layer 132 disposed vertically above the first core layer 122 and electrically coupled to a positive terminal. Accordingly, an electrical current may travel from the positive terminal, through the second power layer 132, through the first core layer 122, through the second core layer 124, and through the first power layer 130 to the negative terminal.

As depicted, the second core layer 124 may be a lower most layer of the power electronic assembly 200, and the first core layer 122 may be stacked vertically above the second core layer 124. Accordingly, in some embodiments, the second core layer may directly abut the second cooling plate 128.

Although the power layers 130, 132 and the core layers 122, 124 are described primarily in relation to the first electrical component 112 and the second electrical component 114 of the first vertical column 150, it should be understood that the descriptions apply equally to the electrical components of the second vertical column 152 and the third vertical column 154 as depicted in FIG. 13.

Figure 14:
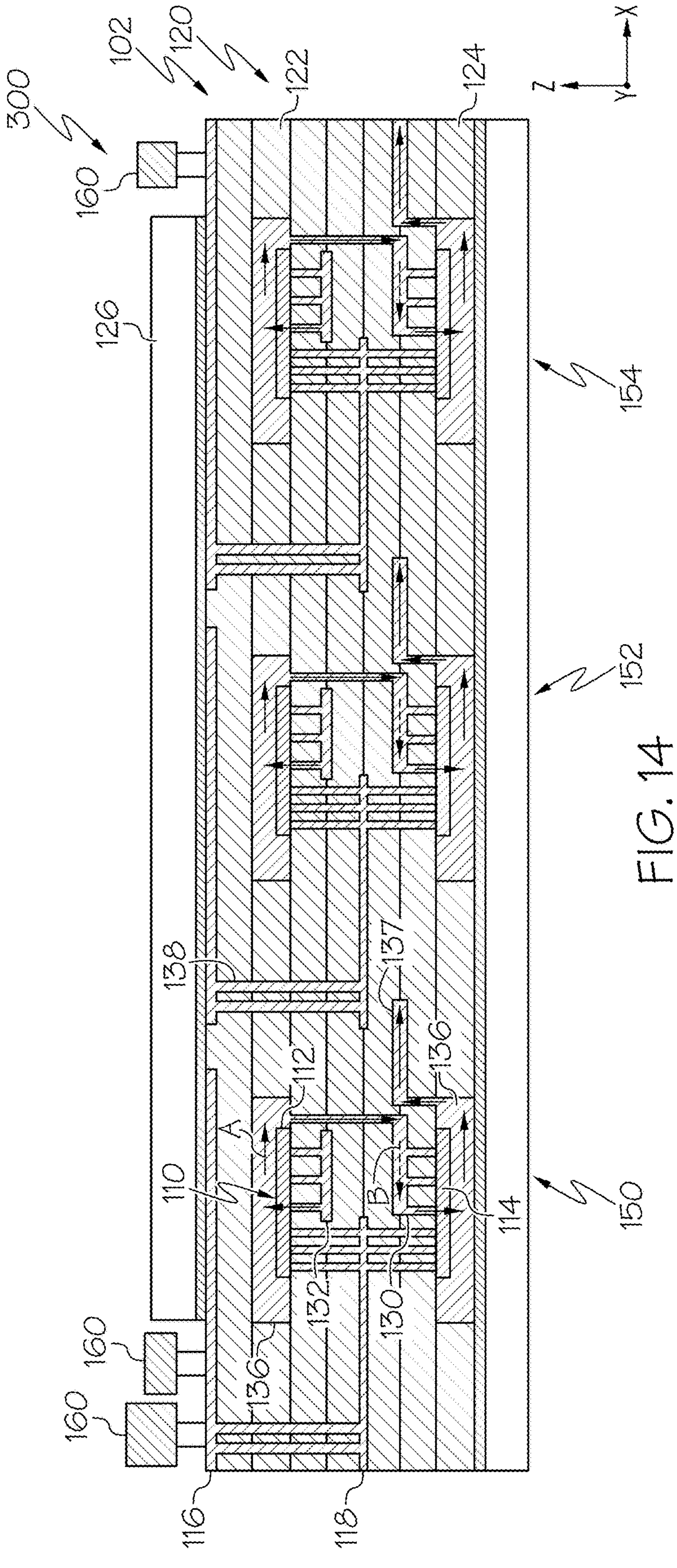
FIG. 14 schematically depicts yet another power electronic assembly, according to one or more embodiments shown and described herein.

Referring now to FIG. 14, an embodiment of a power electronic assembly 300 is schematically depicted. The power electronic assembly 300 is similar to the power electronic assemblies 100 and 200. Accordingly, like numbers are used to refer to like features. For example, the power electronic assembly 300 may include a first electrical component 112 and a second electrical component 114 arranged in a first vertical column 150. Like the power electronic assembly 200, the power electronic assembly 300 may include a first power layer 130 electrically connecting the first electrical component 112 and the second electrical component 114 to both an output terminal and a negative terminal (e.g., by portions 137 extending along the Y-axis as indicated by arrows A). However, the arrangement of the substrate layers 120, including the first power layer 130, may differ. Additionally, the first electrical component 112 and the second electrical component 114 may be arranged facing each other.

The first electrical component 112 may be embedded within the first core layer 122 such that the first electrical component 112 is assembled at the bottom of the first core layer 122. In other words, the first electrical component 112 may be positioned generally below the mounting substrate 136. Comparatively, the second electrical component 114 may be assembled at the top of the second core layer 124 such that the second electronic assembly is positioned generally below the mounting substrate 136. In this way, the first electrical component 112 and the second electrical component 114 can be described as facing each other or arranged in a mirrored configuration.

Still referring to FIG. 14, the second signal layer 118 may be positioned between the first core layer 122 and the second core layer 124 and may be electrically coupled to both the first electrical component 112 and the second electrical component 114 with the conductive vias 138. The first signal layer 116, positioned at the top of the plurality of substrate layers 120, may be electrically coupled to the second signal layer 118 with the conductive vias 138. In this way, the first signal layer 116 and the second signal layer 118 may enable communication between the mounted electrical components and the first electrical component 112 and the second electrical component 114.

The first power layer 130 may be disposed between the first core layer 122 and the second core layer 124. The power electronic assembly 300 may have a second power layer 132 disposed between the first core layer 122 and the second core layer 124 that may be electrically connected to a positive terminal. Disposed between the first power layer 130 and the second power layer 132 may be the second signal layer 118. This arrangement of the first power layer 130, the second power layer 132, and the second signal layer 118 enables the second signal layer 118 to separate the first power layer 130 and second power layer 132. This may preventing unintentional shorting of the circuit.

Figure 15:
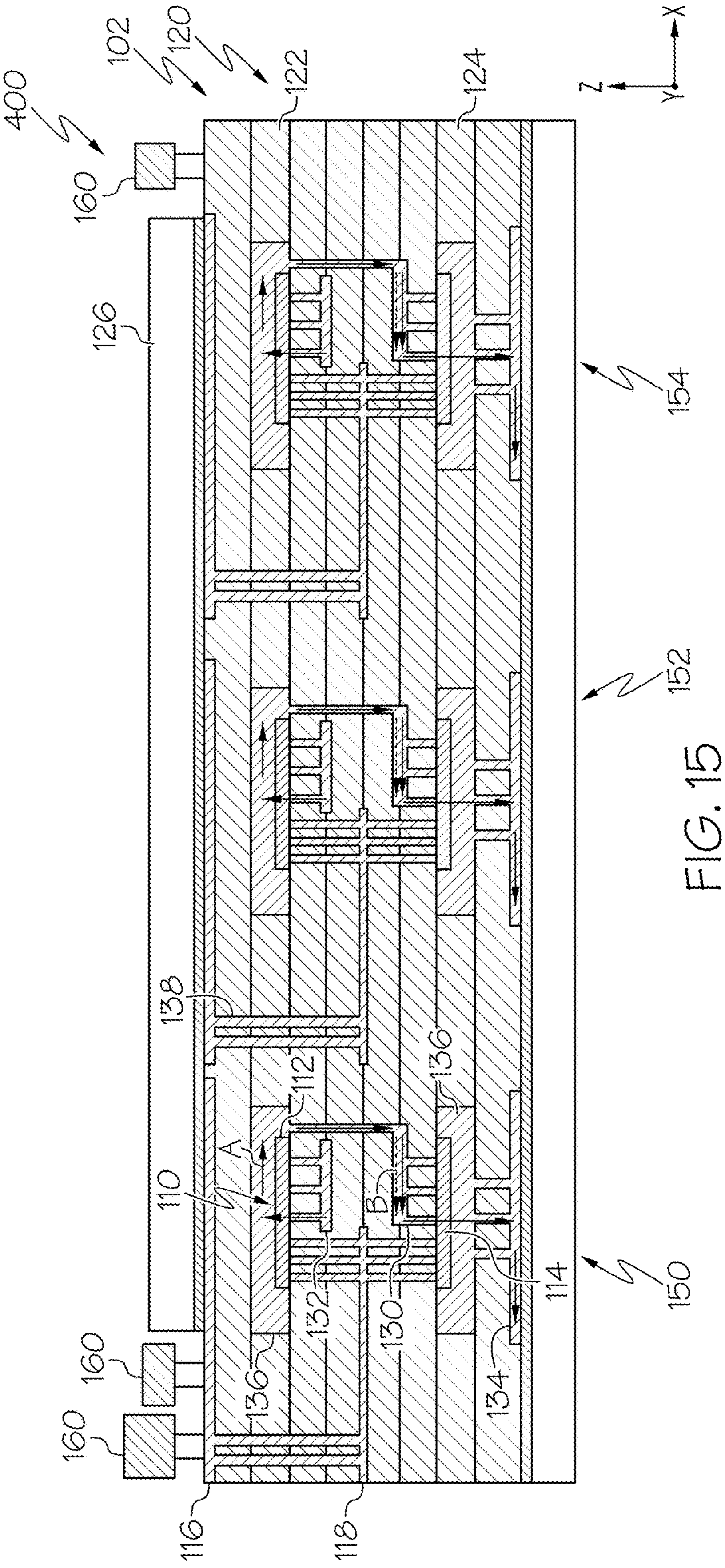
FIG. 15 schematically depicts yet another power electronic assembly, according to one or more embodiments shown and described herein.

Referring now to FIG. 15, an embodiment of a power electronic assembly 400 is schematically depicted. The power electronic assembly 400 is similar to the power electronic assemblies 100, 200, and 300. Accordingly, like numbers are used to refer to like features. For example, the power electronic assembly 400 may include a first electrical component 112 and a second electrical component 114 arranged in a first vertical column 150. Similar to the power electronic assembly 300, the first electrical component 112 and the second electrical component 114 may be arranged facing each other. However, unlike the power electronic assembly 300, the first power layer 130 may electrically connect the first electrical component 112 and the second electrical component 114 to the output terminal while a third power layer 134 electrically connects the first electrical component 112 and the second electrical component 114 to the negative terminal. Accordingly, the specific arrangement of the substrate layers 120 may differ.

As depicted, the first electrical component 112 and the second electrical component 114 may be arranged facing each other, or in a mirrored configuration. The first signal layer 116 may be positioned at the top of plurality of substrate layers 120, and the second signal layer 118 may be positioned between the first core layer 122 and the second core layer 124, such as described with reference to the power electronic assembly 300, hereinabove.

Still referring to FIG. 15, the power electronic assembly 400 may have a first power layer 130 disposed between the first core layer 122 and the second core layer 124 that may electrically connect the first electrical component 112 and the second electrical component 114 to the AC output terminal. The power electronic assembly 400 may have a second power layer 132 disposed between the first core layer 122 and the second core layer 124 that may electrically connect the first electrical component 112 and the second electrical component 114 to a positive terminal. It is noted that the DC current path as indicated by arrows A passes within the same plane as the output of the first power layer 130. The first power layer 130 includes conductive traces offset from the output connection along the Y-axis.

Disposed between the first power layer 130 and the second power layer 132 may be the second signal layer 118. The second signal layer 118 may therefore separate the first power layer 130 and second power layer 132, thereby preventing unintentional shorting of the circuit. Disposed beneath the second power layer 132 and adjacent the second cooling plate 128 may be the third power layer 134, which may electrically connect the first electrical component 112 and the second electrical component 114 to a negative terminal.

Figure 16:
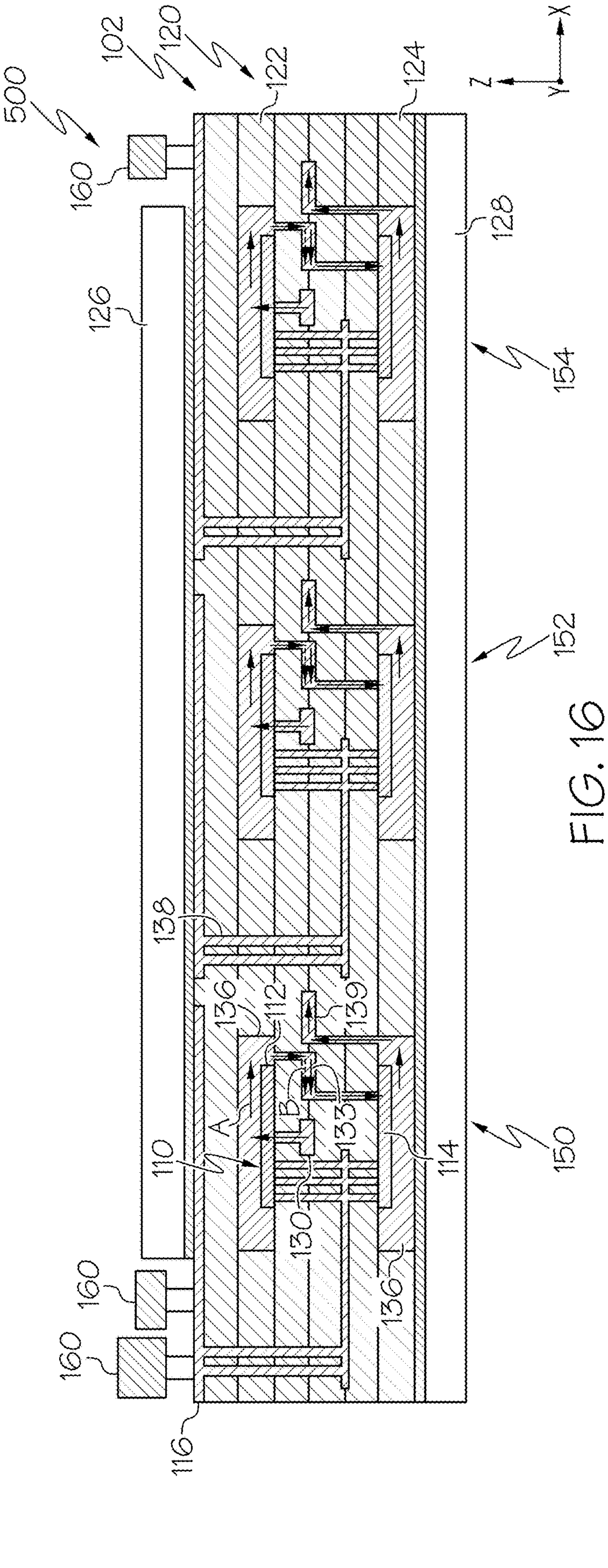
FIG. 16 schematically depicts yet another power electronic assembly, according to one or more embodiments shown and described herein.

Referring now to FIG. 16, an embodiment of a power electronic assembly 500 is schematically depicted. The power electronic assembly 500 is similar to the power electronic assemblies 100, 200, 300, and 400. Accordingly, like numbers are used to refer to like features. For example, the power electronic assembly 500 may include a first electrical component 112 and a second electrical component 114 arranged in a first vertical column 150. Like the power electronic assemblies 300 and 400, the first electrical component 112 and the second electrical component 114 may be arranged facing each other. However, unlike the power electronic assemblies 100, 200, and 300, the power electronic assembly 400 include only a first power layer 130 and may not include a second power layer 132 or a third power layer 134 as described with reference to the earlier embodiments. Rather, the first power layer 130 has electrically conductive portions that are electrically coupled to a positive terminal, an output terminal, and a negative terminal.

As depicted, the first electrical component 112 and the second electrical component 114 may be arranged facing each other, or in a mirrored configuration. The first signal layer 116 may be positioned at the top of plurality of substrate layers 120, and the second signal layer 118 may be positioned between the first core layer 122 and the second core layer 124, such as described with reference to the power electronic assemblies 300 and 400, hereinabove.

The power electronic assembly 500 may include a first power layer 130 that may be coupled to a positive terminal, negative terminal (by electrically conductive portion 139), and output terminal (by electrically conductive portion 133). Accordingly, the power electronic assembly 500 may include a single power layer. The first power layer 130 may be disposed between the first core layer 122 and second core layer 124. The first power layer 130 may be electrically connected to the first core layer 122 and second core layer 124 by the conductive vias 138. Accordingly, an electrical current may travel from the positive terminal, through the first power layer 130, through the first core layer 122, back through the first power layer 130, through the second core layer 124, and back through the first power layer 130 to the negative terminal. By using a single power layer, the power electronic assembly 500 may include six substrate layers 120.

Figure 17:
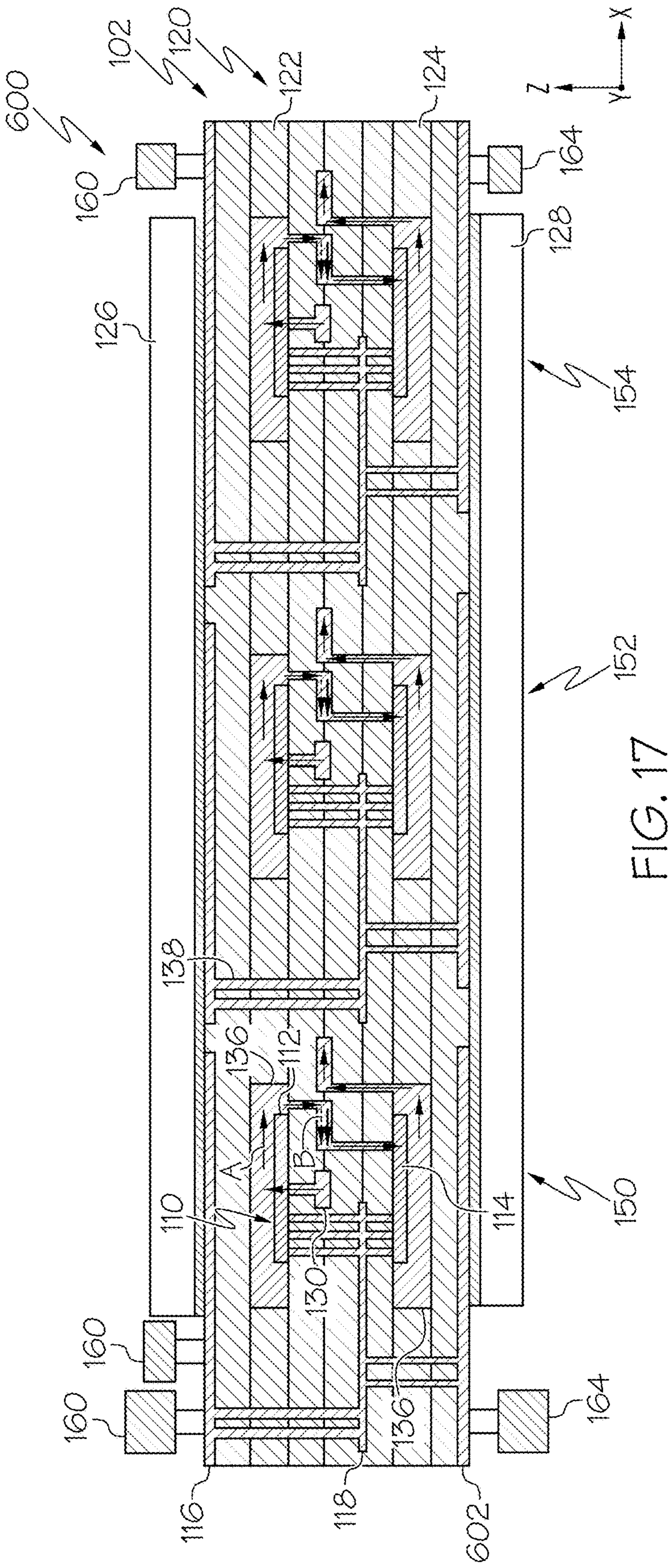
FIG. 17 schematically depicts yet another power electronic assembly, according to one or more embodiments shown and described herein.

Referring now to FIG. 17, an embodiment of a power electronic assembly 600 is schematically depicted. The power electronic assembly 600 is similar to the power electronic assemblies 100, 200, 300, 400, and 500. Accordingly, like numbers are used to refer to like features. For example, the power electronic assembly 600 may include a first electrical component 112 and a second electrical component 114 arranged in a first vertical column 150. As will be described herein, the power electronic assembly 600 may include a second selection of one or more mounted electronics 164 in addition to the one or more mounted electronics 160.

The power electronic assembly 600 may include a first power layer 130, which may be a single power layer disposed between the first core layer 122 and second core layer 124, such as described with reference to the power electronic assembly 500 hereinabove.

The power electronic assembly 600 may a first signal layer 116 disposed vertically above the first core layer 122, a second signal layer 118 disposed between the first core layer 122 and the second core layer 124, and a third signal layer 602 disposed vertically below the second core layer 124. One or more mounted electronics 160 may be electrically coupled to the first signal layer 116. The second selection of one or more mounted electronics 164 may be electrically coupled to the third signal layer 602. The first signal layer 116 and the third signal layer 602 may each be electrically coupled to the second signal layer 118 by the conductive vias 138. The second signal layer 118 may be electrically connected to the first electrical component 112 and the second electrical component 114 by the conductive vias 138. In this way, both the first electrical component 112 and the second electrical component 114 may be in communication with the mounted electronics 160 and the second selection of one or more mounted electronics 164 via the second signal layer 118. This arrangement may increase the available area for mounted electronics by enabling mounting along both the top and bottom of the printed circuit board 102.

In view of the above, it should now be understood that embodiments of the present disclosure are directed to power electronics systems having a chip-on-chip structure in a compact design that can be cooled by direct immersion within a cooling fluid. The power electronics system also provide for two-inverter and state selector that enables operation in a low power mode and a high power mode, as well as the ability to charge at two different voltage levels (e.g., 400V and 800V). The power electronic systems described herein provide a compact and flexible solution for electrified vehicles having low cost/high performance benefits as well as compatibility between different ultra-fast charging voltage standards.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A power electronics system for an electric motor, the power electronics system comprising:

a first inverter package comprising a first housing defining a first enclosure and three metal-oxide-semiconductor field-effect transistor (MOSFET) pairs disposed within the first enclosure, wherein an output of each MOSFET of each MOSFET pair are coupled together and operable to be electrically coupled to a first end of a winding of the electric motor, and the MOSFET pairs are cooled by immersion within a dielectric cooling fluid;

a second inverter package comprising a second housing defining a second enclosure and three insulated-gate bi-polar transistor (IGBT) pairs disposed within the second enclosure, wherein an output of each IGBT of each IGBT pair are coupled together and operable to be electrically coupled to a second end of the winding of the electric motor, and the IGBT pairs are cooled by immersion within the dielectric cooling fluid;

a state selector circuit operable to selectively electrically couple the second ends of the windings of the electric motor together; and a charger input circuit operable to receive a first DC voltage, wherein the charger input circuit, the windings of the electric motor, the MOSFET pairs of the first inverter package are operable to convert the first DC voltage to a second DC voltage, and the second DC voltage is greater than the first DC voltage.

2. The power electronics system of claim 1, wherein:

in a low power mode the second ends of the windings of the electric motor are coupled together by the state selector circuit; and in a high power mode the state selector circuit is off such that electrical current flows through both the first inverter package and the second inverter package.

3. The power electronics system of claim 1, wherein:

the charger input circuit comprises a relay and a positive input voltage terminal; and during a charging mode, the state selector circuit electrically couples the second ends of the windings of the electric motor together and the relay electrically couples the second ends of the windings of the electric motor to the positive input voltage terminal and a positive terminal of a battery.

4. The power electronics system of claim 3, further comprising:

a positive relay between the positive terminal of the battery and a positive terminal of the second inverter package;

three output relays, each output relay positioned between an individual output of the second inverter package and the second end of an individual winding of the electric motor; and a negative relay between a negative terminal of the battery and a negative terminal of the second inverter package.

5. The power electronics system of claim 4, further comprising:

three additional output relays, each additional output relay positioned between an individual output of the first inverter package and the first end of an individual winding of the electric motor; and an additional state selector circuit operable to selectively electrically couple the first ends of the windings of the electric motor together.

6. The power electronics system of claim 1, wherein:

the MOSFETs of an individual MOSFET pair are arranged in a z-axis; and the IGBTs of an individual IGBT pair are arranged on the z-axis.

7. The power electronics system of claim 1, wherein the MOSFETs are fully embedded within a first inverter circuit board and the IGBTs are fully embedded within a second inverter circuit board.

8. An electric drive train system comprising:

a battery;

an electric motor comprising windings; and a power electronics system comprising:

a first inverter package comprising a first housing defining a first enclosure and three metal-oxide-semiconductor field-effect transistor (MOSFET) pairs disposed within the first enclosure, wherein:

an output of each MOSFET of each MOSFET pair are coupled together and electrically coupled to a first end of an individual winding of the electric motor, and the first housing comprises a first inlet and a first outlet for receiving and removing a dielectric cooling fluid, to and from the first enclosure, respectively, such that the MOSFET pairs are cooled by immersion within the dielectric cooling fluid;

a second inverter package comprising a second housing defining a second enclosure and three insulated-gate bi-polar transistor (IGBT) pairs disposed within the second enclosure, wherein:

an output of each IGBT of each IGBT pair are coupled together and electrically coupled to a second end of an individual winding of the electric motor, and the second housing comprises a second inlet and a second outlet for receiving and removing the dielectric cooling fluid to and from the second enclosure, respectively, such that the IGBT pairs are cooled by immersion within the dielectric cooling fluid;

a state selector circuit operable to selectively electrically couple the second ends of the windings of the electric motor together; and a charger input circuit operable to receive a first DC voltage, wherein the charger input circuit, the windings of the electric motor, the MOSFET pairs of the first inverter package are operable to convert the first DC voltage to a second DC voltage, and the second DC voltage is greater than the first DC voltage.

9. The electric drive train system of claim 8, wherein:

the charger input circuit comprises a relay and a positive input voltage terminal; and during a charging mode, the state selector circuit electrically couples the second ends of the windings of the electric motor together and the relay electrically couples the second ends of the windings of the electric motor to the positive input voltage terminal and a positive terminal of the battery.

10. The electric drive train system of claim 9, further comprising:

a positive relay between the positive terminal of the battery and a positive terminal of the second inverter package; and three output relays, each output relay positioned between an individual output of the second inverter package and the second end of an individual winding of the electric motor; and a negative relay between a negative terminal of the battery and a negative terminal of the second inverter package.

11. The electric drive train system of claim 10, further comprising:

three additional output relays, each additional output relay positioned between an individual output of the first inverter package and the first end of an individual winding of the electric motor;

an additional state selector circuit operable to selectively electrically couple the first ends of the windings of the electric motor together.

12. The electric drive train system of claim 8, wherein:

the MOSFETs of an individual MOSFET pair are arranged in a z-axis; and the IGBTs of an individual IGBT pair are arranged on the z-axis.

13. The electric drive train system of claim 8, wherein the MOSFETs are fully embedded within a first inverter circuit board and the IGBTs are fully embedded within a second inverter circuit board.

14. The electric drive train system of claim 8, wherein the electric motor, the first inverter package and the second inverter package are fluidly coupled together and are cooled by the dielectric cooling fluid.

15. The electric drive train system of claim 14, wherein the electric motor, the first inverter package and the second inverter package are fluidly coupled together in series.

16. The electric drive train system of claim 15, wherein the dielectric cooling fluid flows in a cooling fluid loop first through the second inverter package, second through the first inverter package and third through the electric motor.

17. The electric drive train system of claim 15, wherein the dielectric cooling fluid flows in a cooling fluid loop first through the second inverter package, second through the electric motor and third through the first inverter package.

18. The electric drive train system of claim 15, wherein the dielectric cooling fluid flows in a cooling fluid loop first through the electric motor, second through the second inverter package and third through the first inverter package.

19. The electric drive train system of claim 15, wherein the dielectric cooling fluid flows in a cooling fluid loop such that the dielectric cooling fluid flows through the first inverter package before flowing through the second inverter package.

20. The electric drive train system of claim 19, wherein second inverter package comprises a temperature sensor and the first inverter package does not include a temperature sensor.

* * * * *